(12) United States Patent
Ding et al.

(10) Patent No.: US 11,281,334 B2
(45) Date of Patent: Mar. 22, 2022

(54) INTERACTION METHOD, SYSTEM, AND DEVICE FOR INFORMATION

(71) Applicant: SAMSUNG ELECTRONICS CO., LTD., Suwon-si (KR)

(72) Inventors: Lin Ding, Nanjing (CN); Xiaofei Zhang, Nanjing (CN); Yuan Zhang, Nanjing (CN); Genying Xie, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/954,895

(22) PCT Filed: Nov. 30, 2018

(86) PCT No.: PCT/KR2018/015139
§ 371 (c)(1),
(2) Date: Jun. 17, 2020

(87) PCT Pub. No.: WO2020/111346
PCT Pub. Date: Jun. 4, 2020

(65) Prior Publication Data
US 2020/0379589 A1   Dec. 3, 2020

(51) Int. Cl.
*G06F 3/042* (2006.01)
*G06F 40/174* (2020.01)

(52) U.S. Cl.
CPC ............ *G06F 3/042* (2013.01); *G06F 40/174* (2020.01)

(58) Field of Classification Search
CPC .................. G06F 3/042; G06F 40/174
(Continued)

(56) References Cited

U.S. PATENT DOCUMENTS

2013/0027326 A1   1/2013  Kim et al.
2015/0169049 A1*  6/2015  Ko .................. G09G 5/006
                                                 345/156
(Continued)

FOREIGN PATENT DOCUMENTS

CN   102903723 A   1/2013
CN   103067462 A   4/2013
(Continued)

OTHER PUBLICATIONS

International Search Report (PCT/ISA/210) dated Aug. 28, 2019 by the International Searching Authority in counterpart International Patent Application No. PCT/KR2018/015139.
(Continued)

*Primary Examiner* — Prabodh M Dharia
(74) *Attorney, Agent, or Firm* — Sughrue Mion, PLLC

(57) ABSTRACT

The present application discloses interaction method, system, and device for information. After recognizing a nontransparent shielding object or a second device, a first device with a light-sensing screen provided in the embodiments of the present application transmits shielded screen information to the second device for processing. One example is that the second device sends an operation instruction to the first device with a light-sensing screen according to a use scenario of a user, to change the screen information stored or/and displayed in the first device with a light-sensing screen. In this way, Interaction for information according to user requirements based on a photosensitive recognition technology between different devices may be implemented according to this application.

14 Claims, 21 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2016/0109937 A1* | 4/2016 | Kim ........................ | G06F 1/163 345/156 |
| 2016/0307539 A1 | 10/2016 | Lee et al. | |
| 2017/0163715 A1 | 6/2017 | Fang | |
| 2017/0299775 A1* | 10/2017 | Hamberg ................. | G02B 1/18 |
| 2018/0091501 A1* | 3/2018 | Trahe .................. | H04L 63/0853 |
| 2018/0095656 A1 | 4/2018 | Ingah et al. | |
| 2019/0135199 A1* | 5/2019 | Galan Garcia ...... | H03K 17/975 |
| 2020/0196136 A1* | 6/2020 | Shelton ............... | H04W 12/084 |

FOREIGN PATENT DOCUMENTS

| | | | | | |
|---|---|---|---|---|---|
| CN | 103491140 | A | | 1/2014 | |
| CN | 103530056 | A | | 1/2014 | |
| CN | 103701987 | A | | 4/2014 | |
| CN | 203632707 | A | | 6/2014 | |
| CN | 103905561 | A | | 7/2014 | |
| CN | 104156217 | A | | 11/2014 | |
| CN | 104317190 | A | | 1/2015 | |
| CN | 104821978 | A | | 8/2015 | |
| CN | 104796535 | A | * | 9/2017 | ............ H04M 1/725 |
| CN | 107515717 | A | * | 12/2017 | ........... G06F 3/0487 |
| KR | 10-2017-0090102 | A | | 8/2017 | |
| KR | 20170090102 | A | * | 8/2017 | ......... H04N 21/4402 |

OTHER PUBLICATIONS

Written Opinion (PCT/ISA/237) dated Aug. 28, 2019 by the International Searching Authority in counterpart International Patent Application No. PCT/KR2018/015139.

* cited by examiner

[Fig. 1]
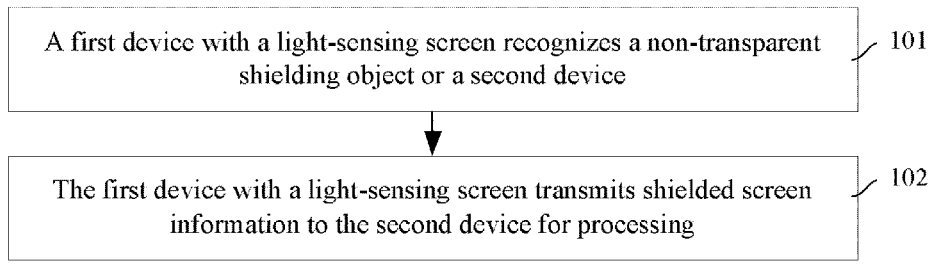
[Fig. 2]
[Fig. 3]
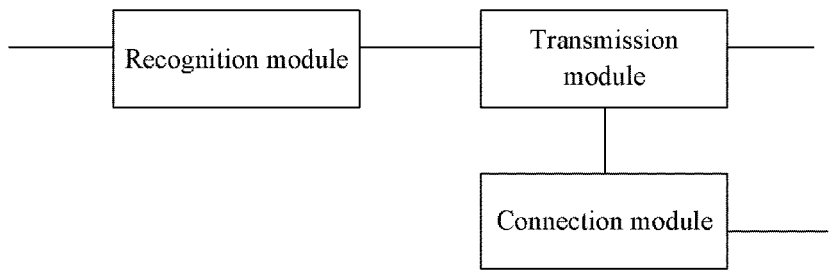
[Fig. 4]
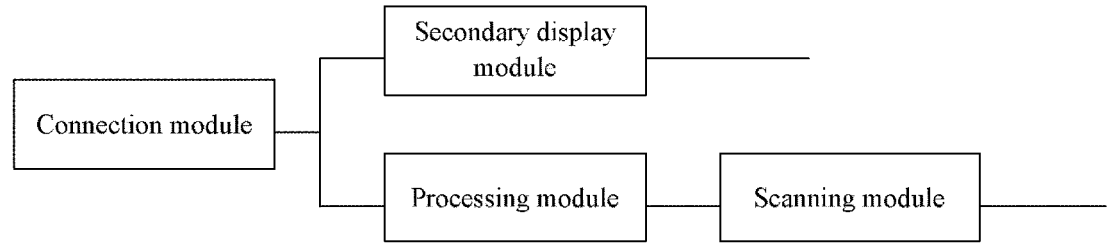

[Fig. 5]
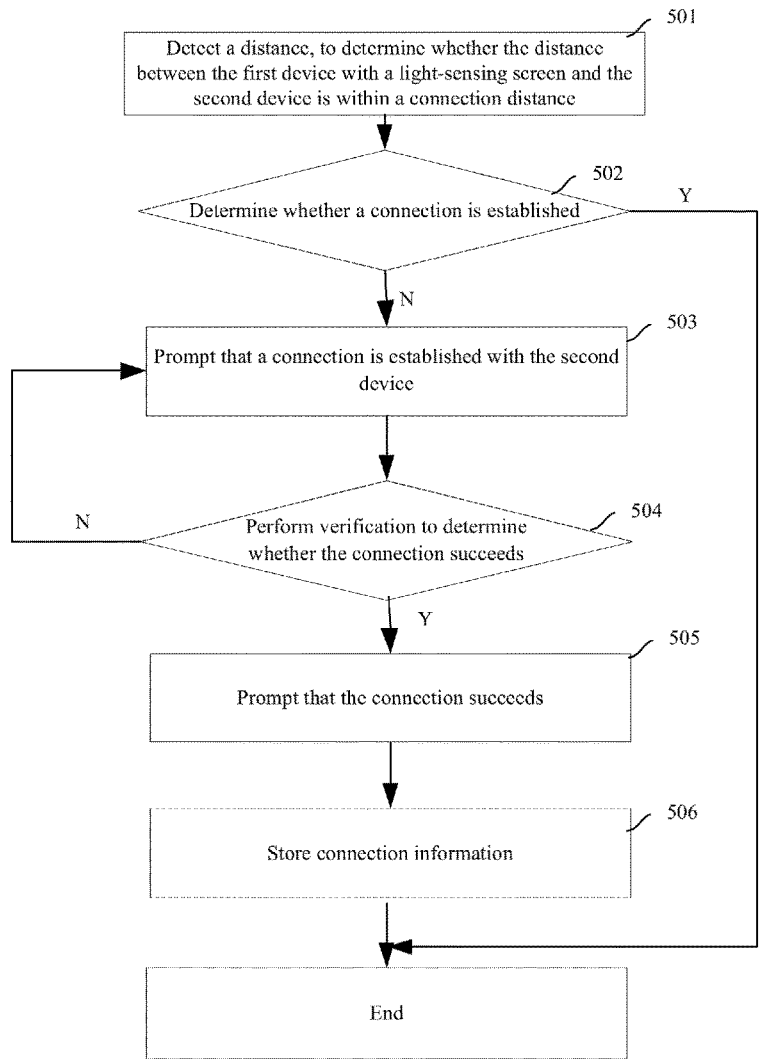
[Fig. 6]
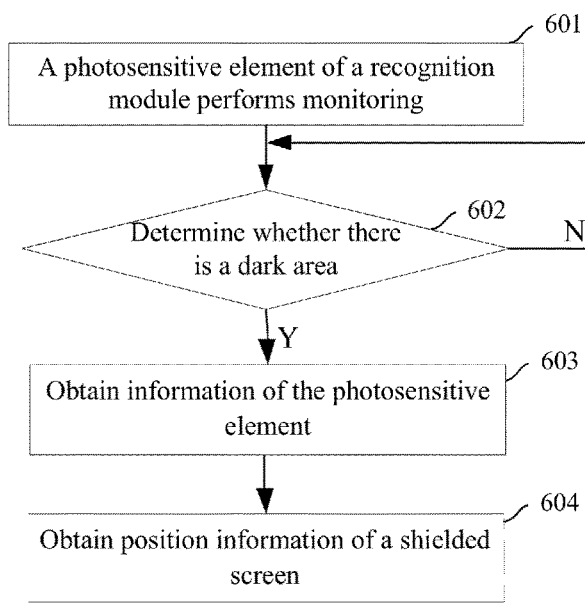

[Fig. 7]
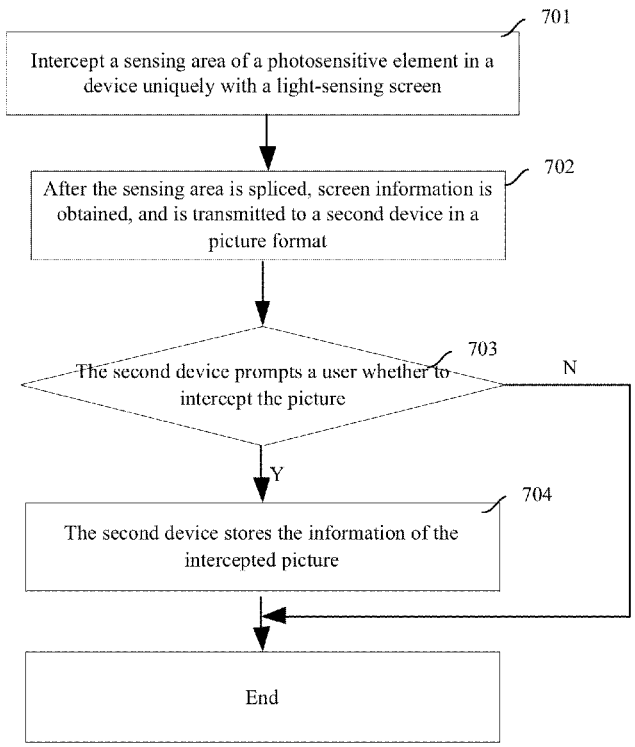
[Fig. 8]
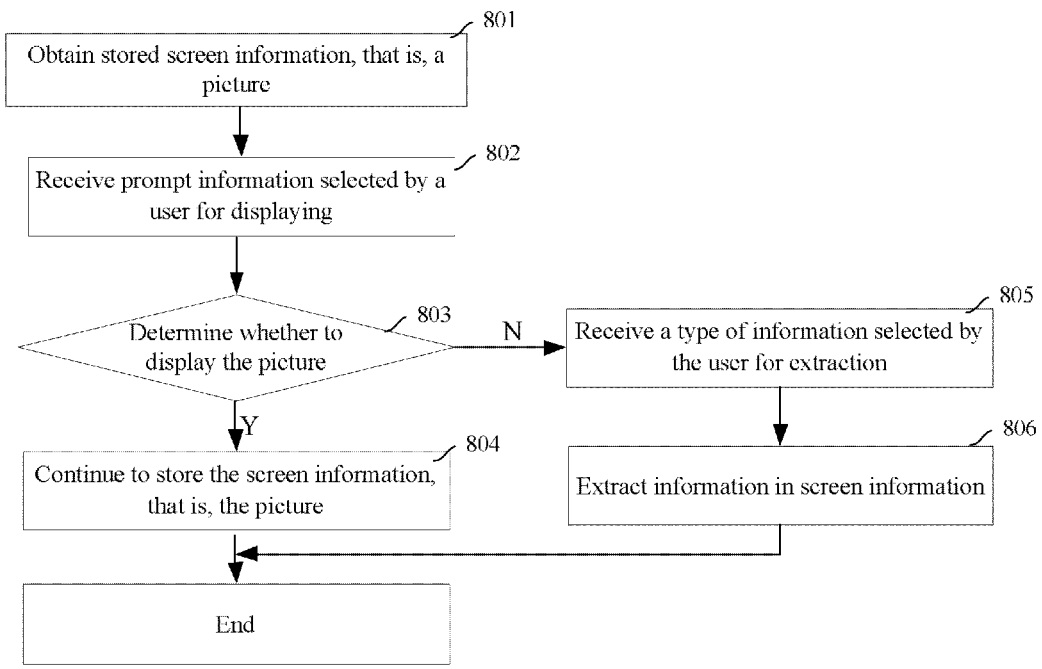

[Fig. 9]
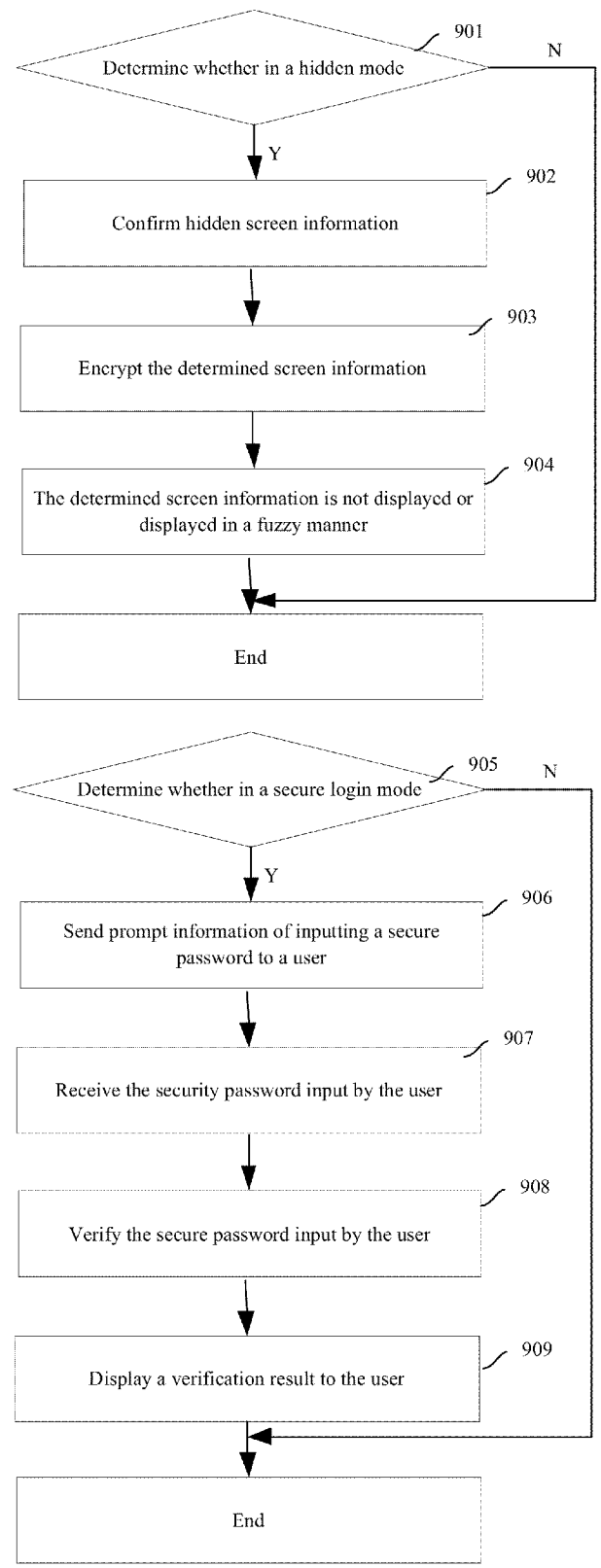

[Fig. 10]
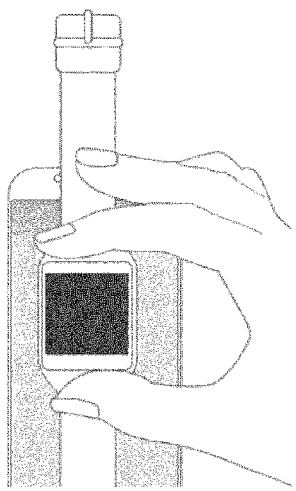
[Fig. 11]
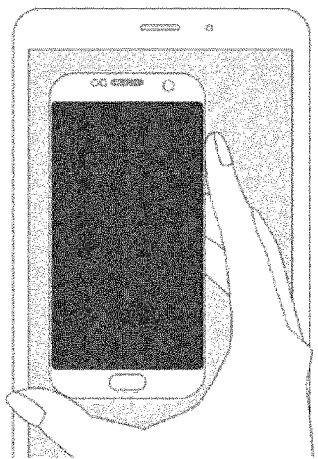
[Fig. 12]
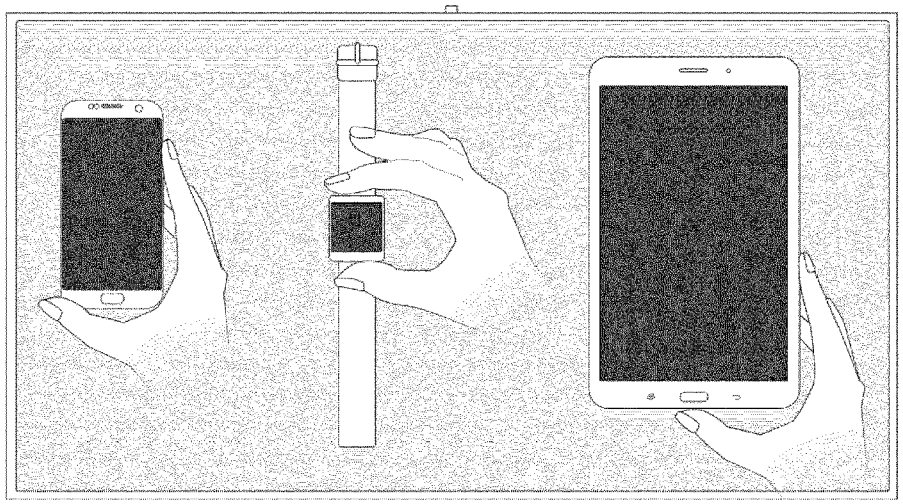

[Fig. 13]
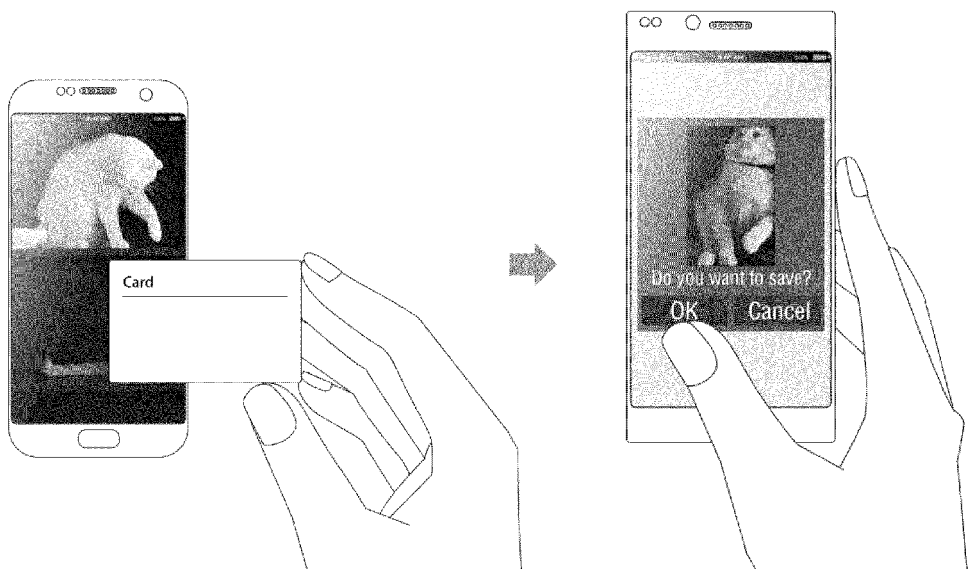
[Fig. 14]
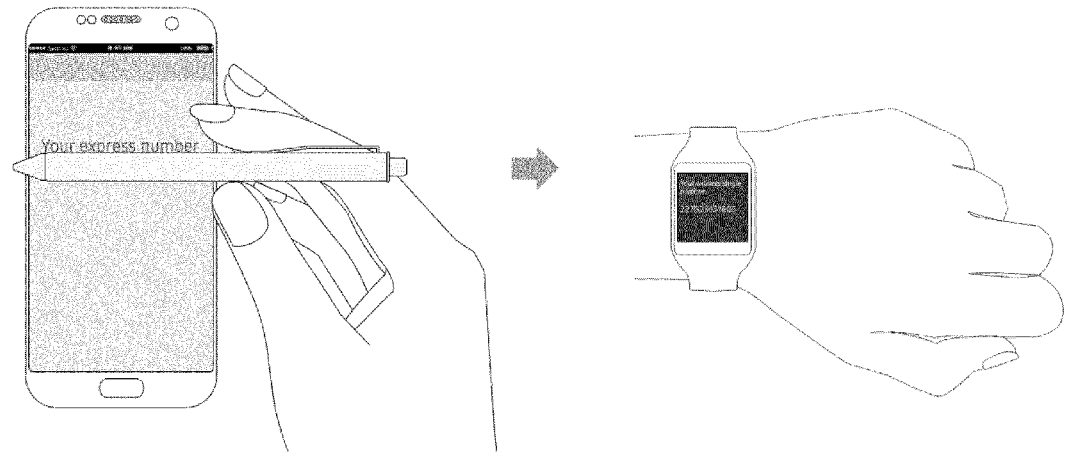

[Fig. 15]
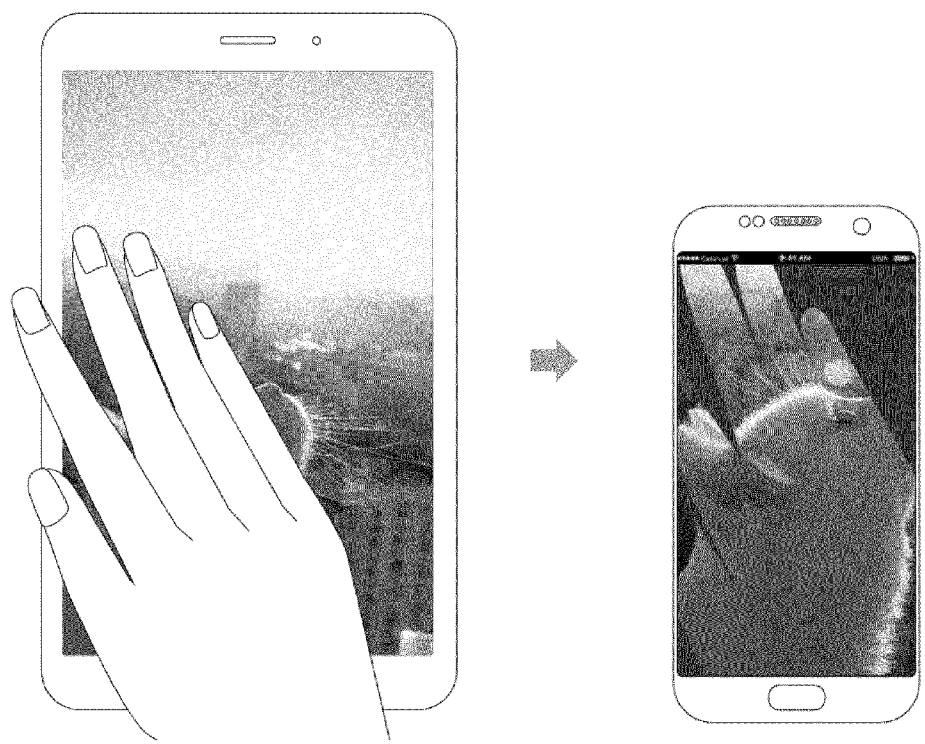

[Fig. 16]
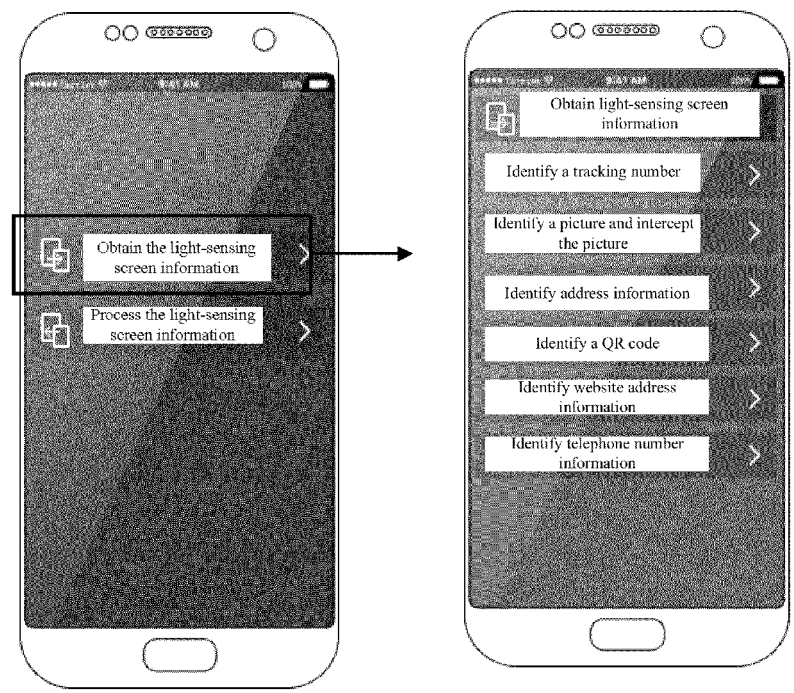
1. Click a home page>Obtain light-sensing screen information
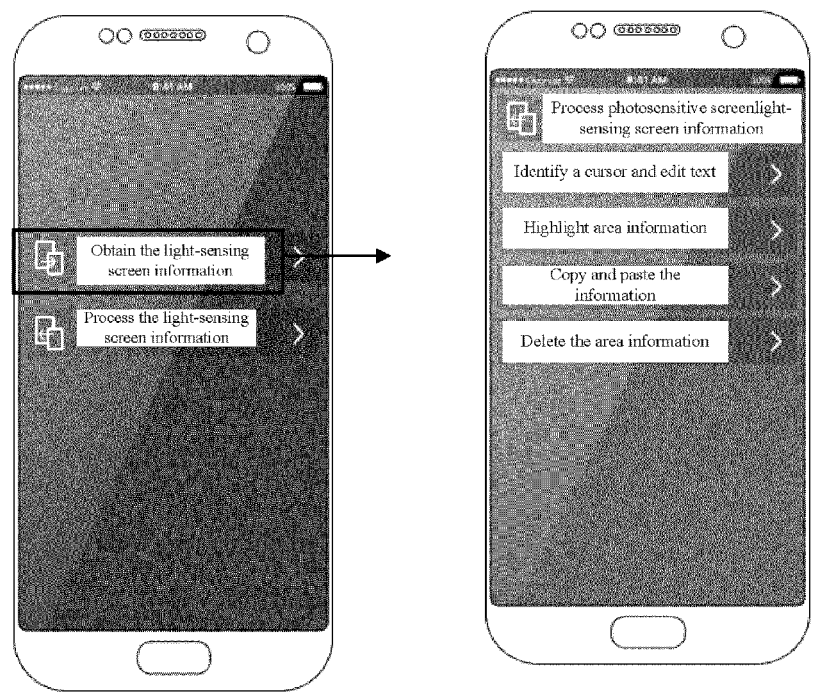
1. Click a home page>Obtain light-sensing screen information
2. Select a needed processing command

[Fig. 17]
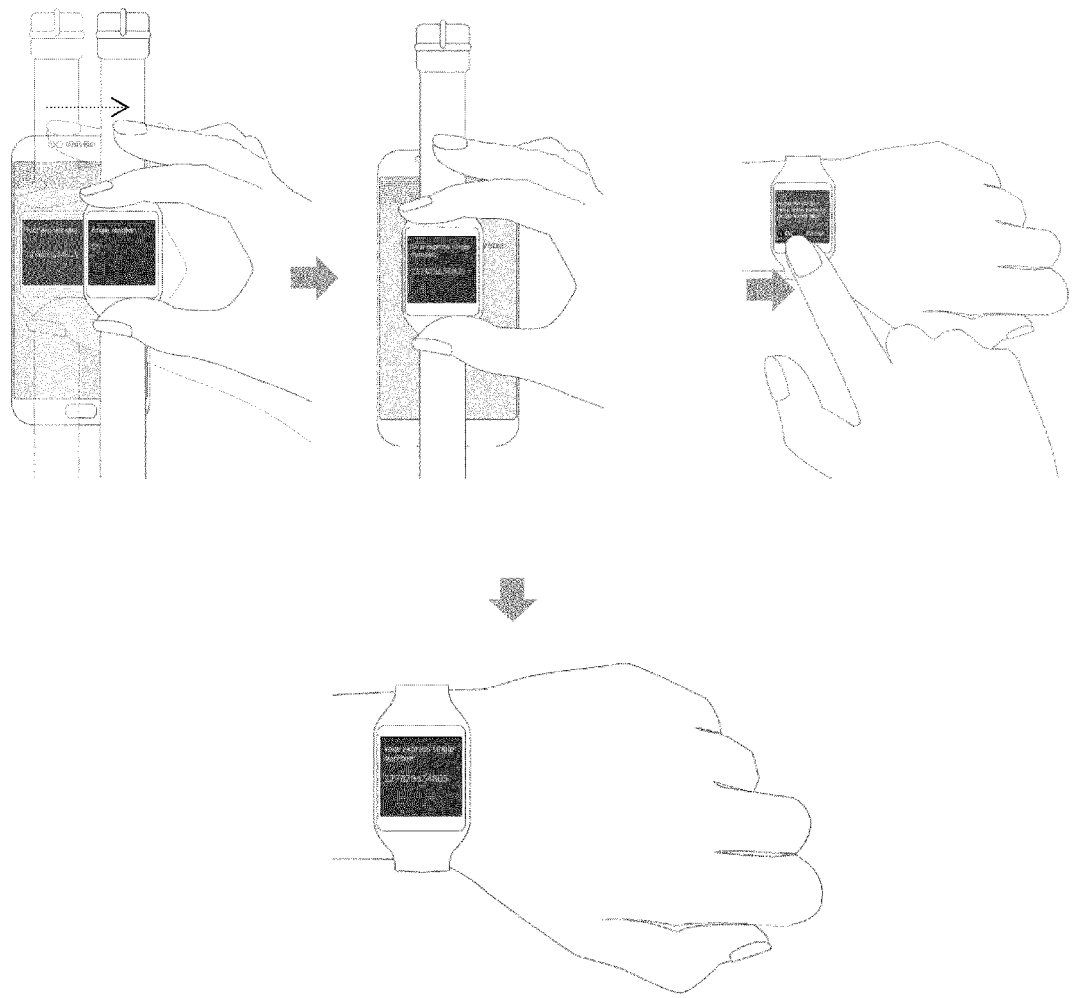

[Fig. 18]
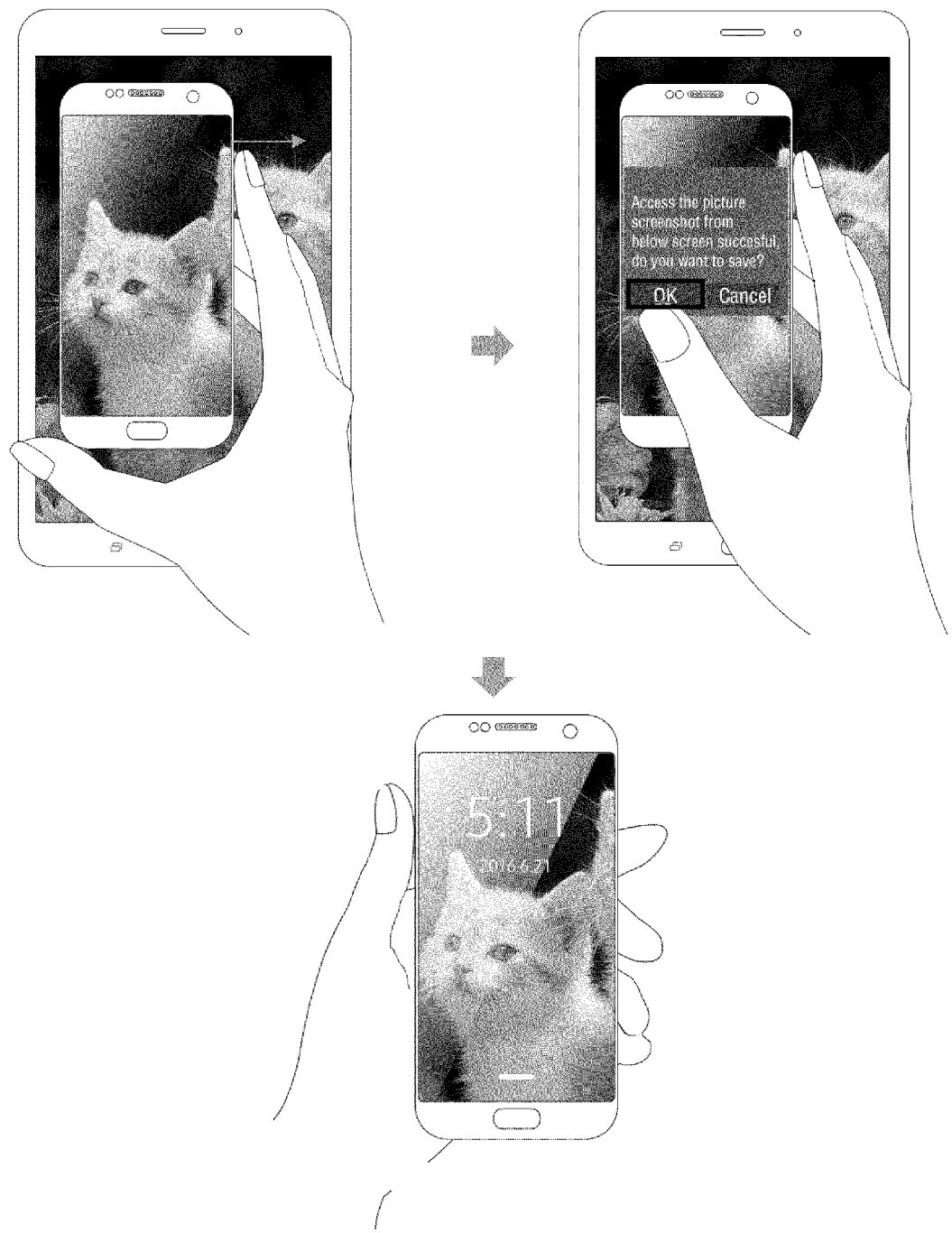

[Fig. 19]
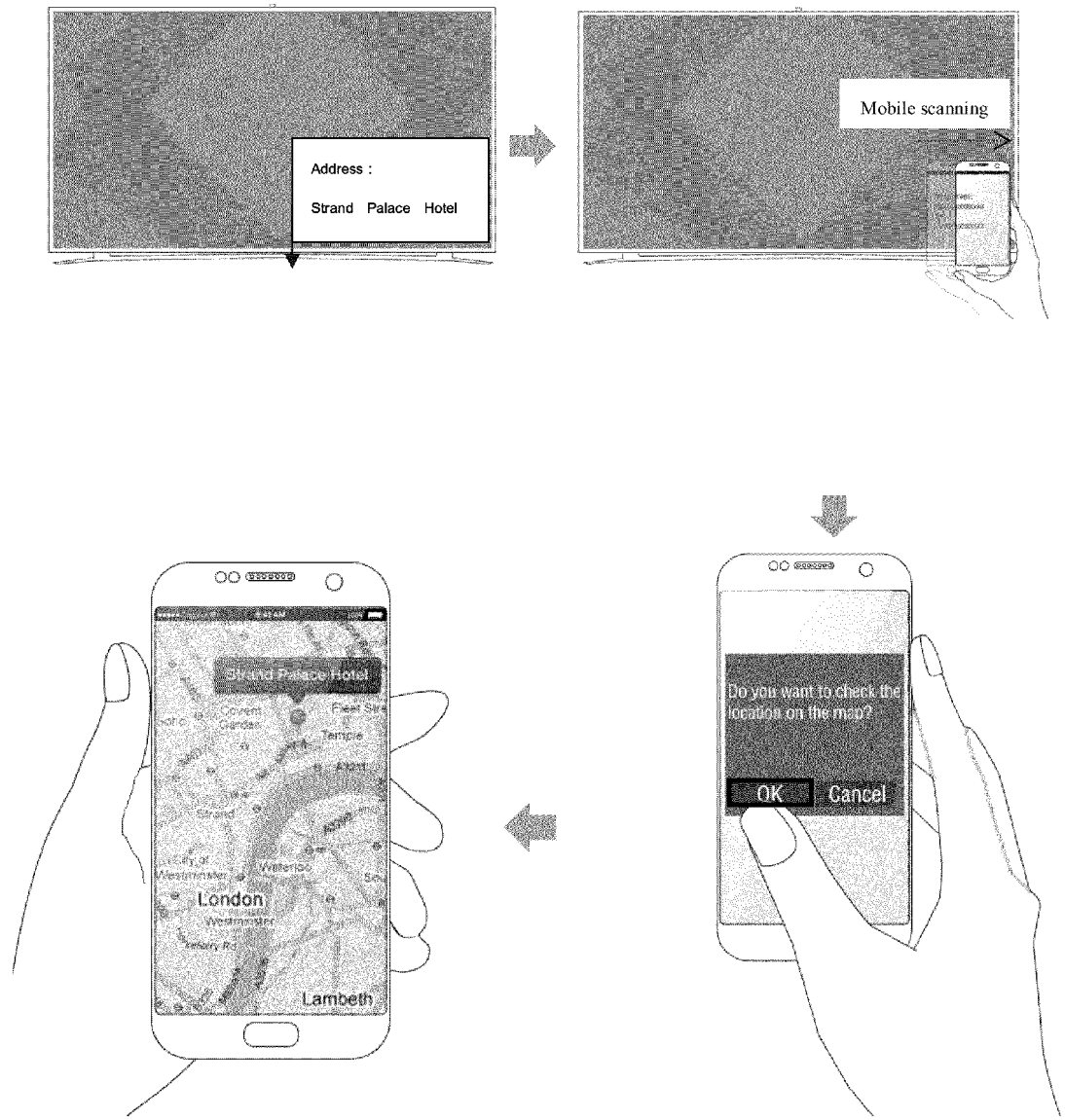

[Fig. 20]
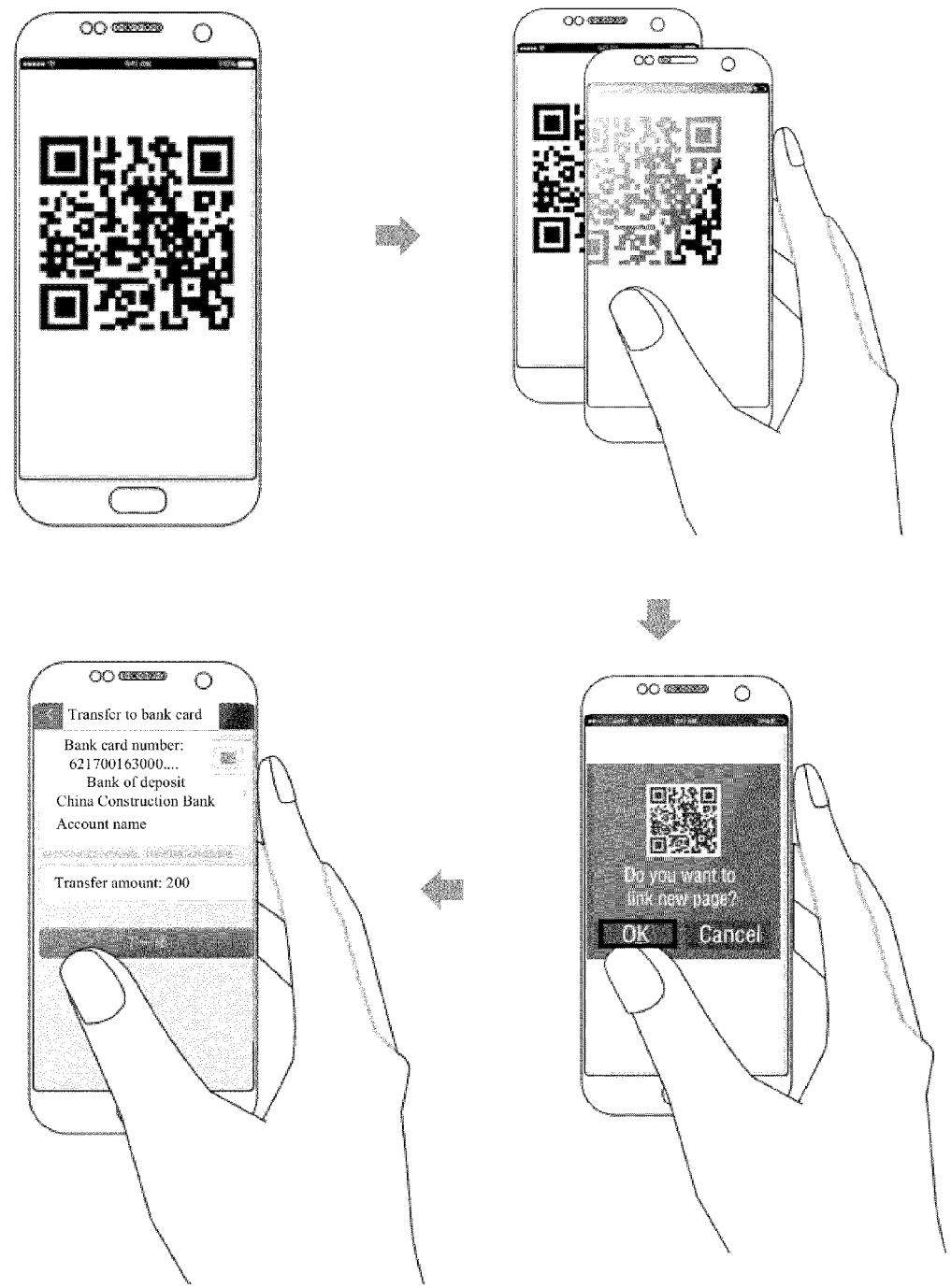

[Fig. 21]
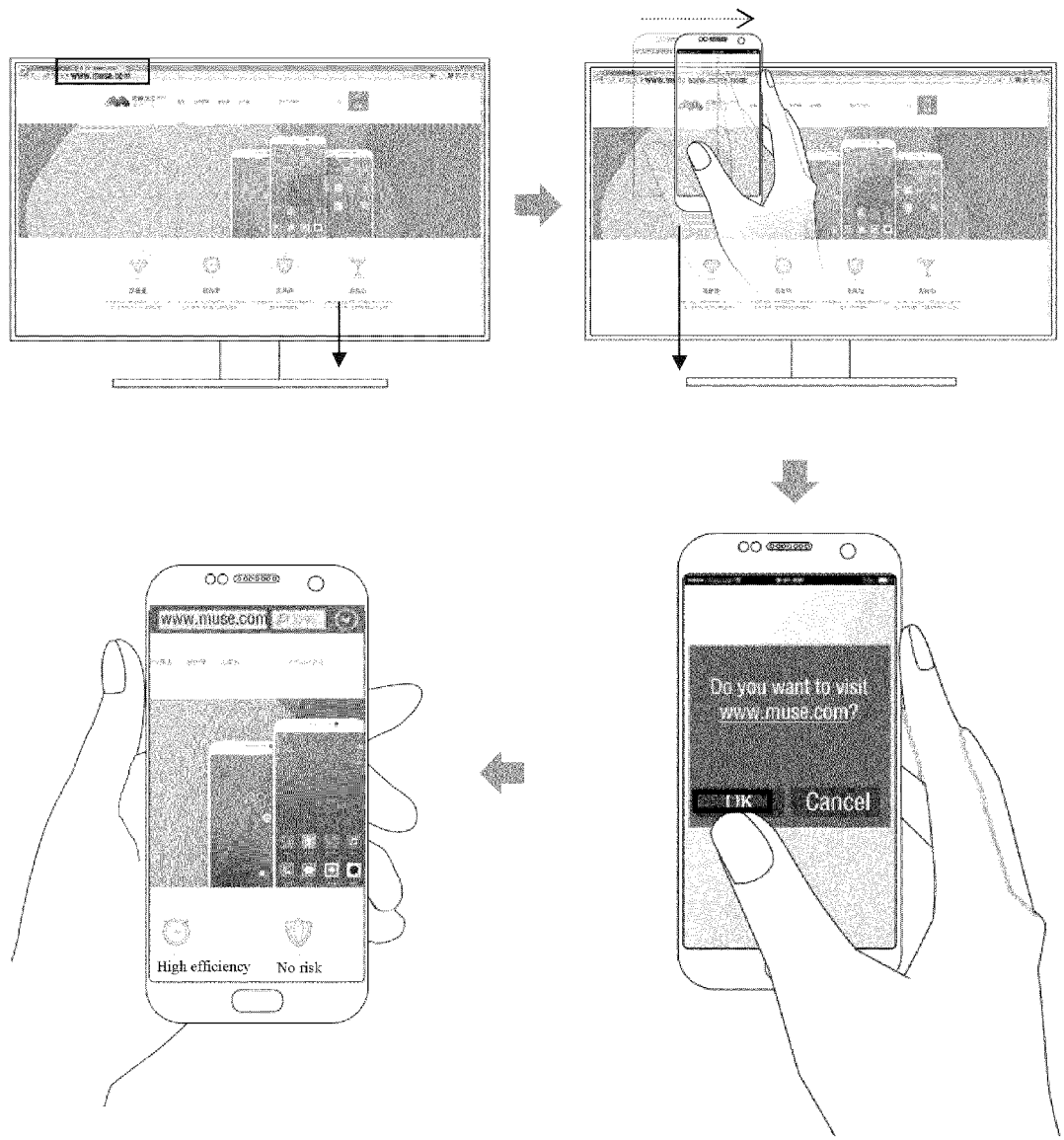

[Fig. 22]
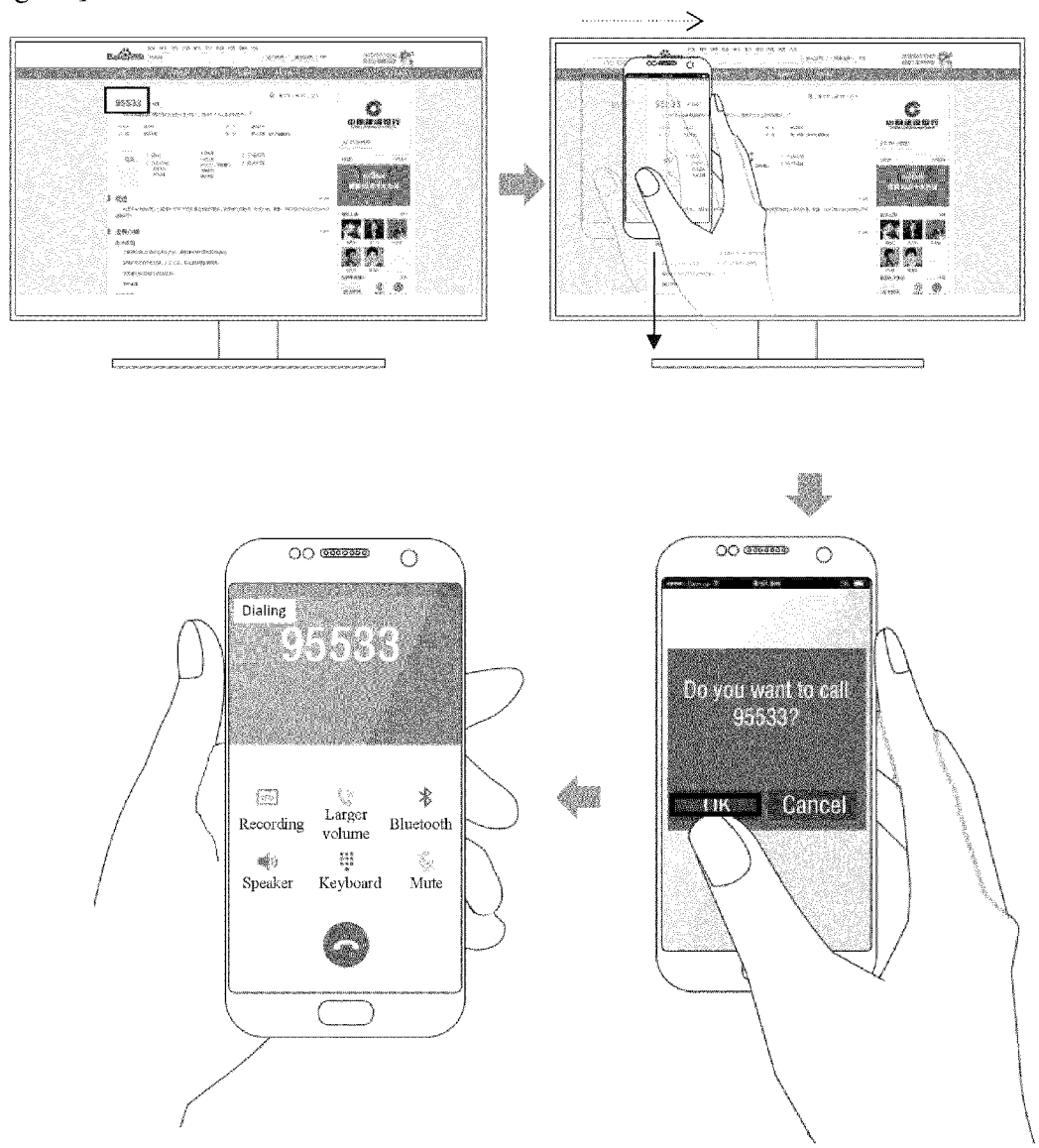

[Fig. 23]
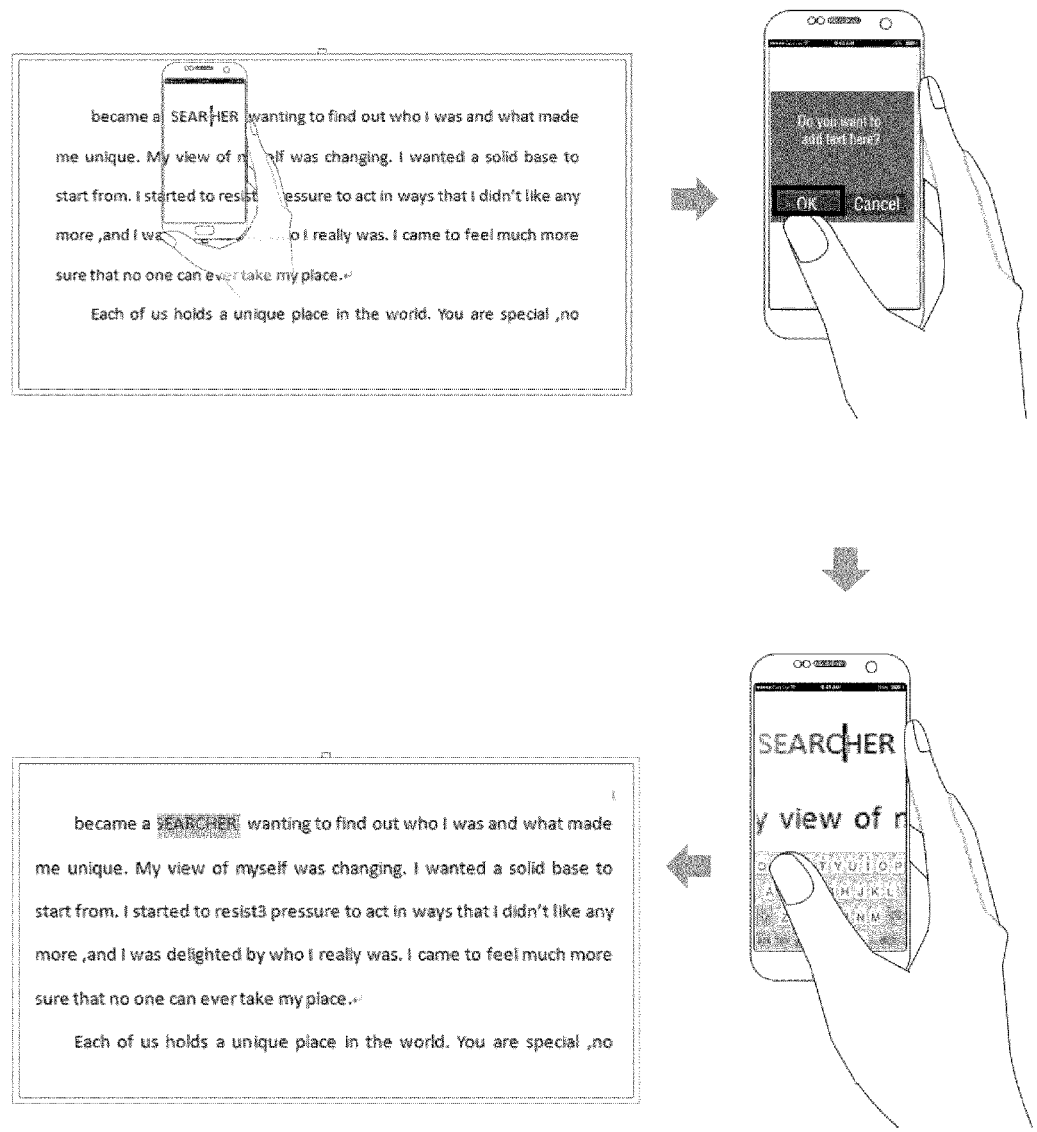

[Fig. 24]

[Fig. 25]
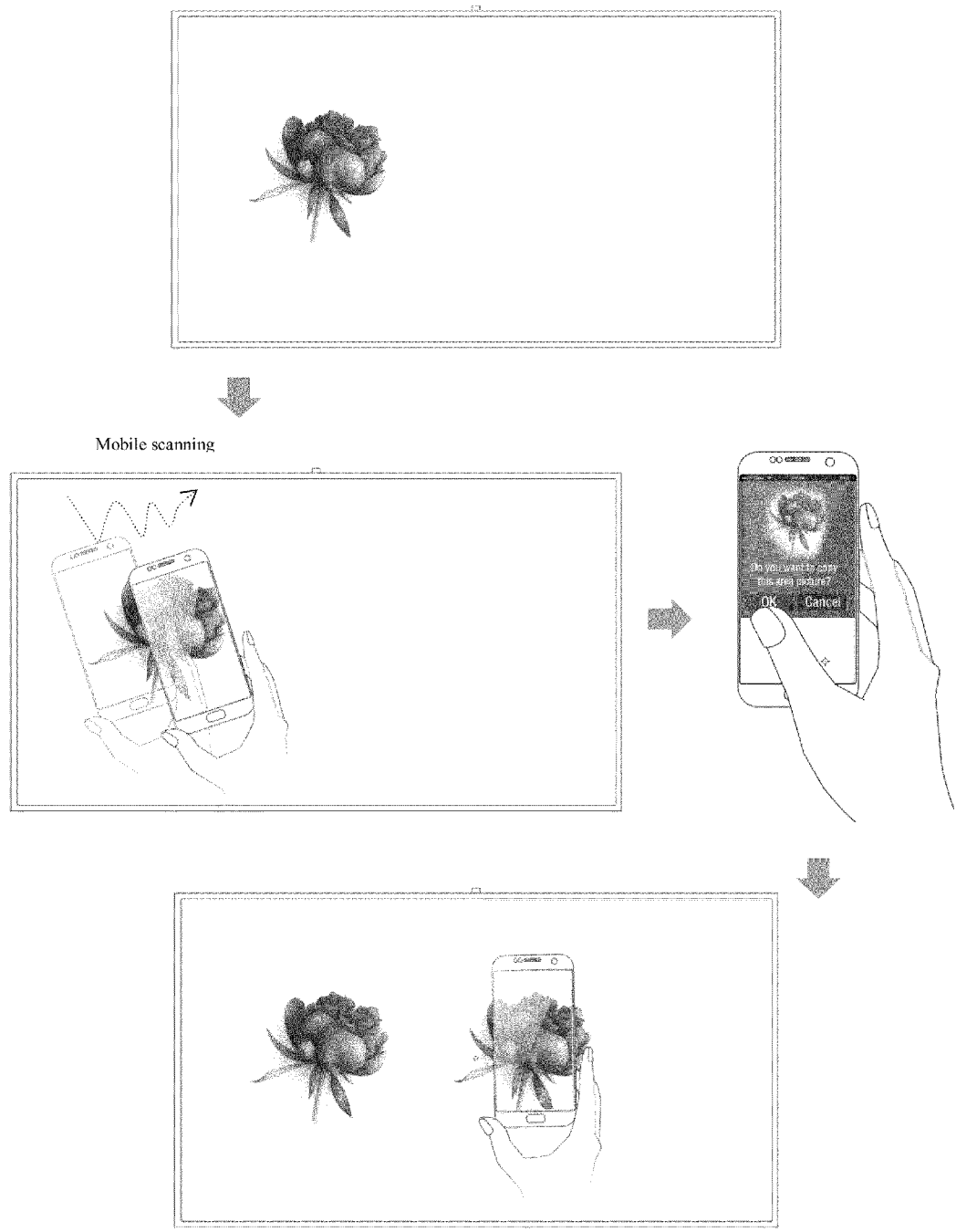

[Fig. 26]
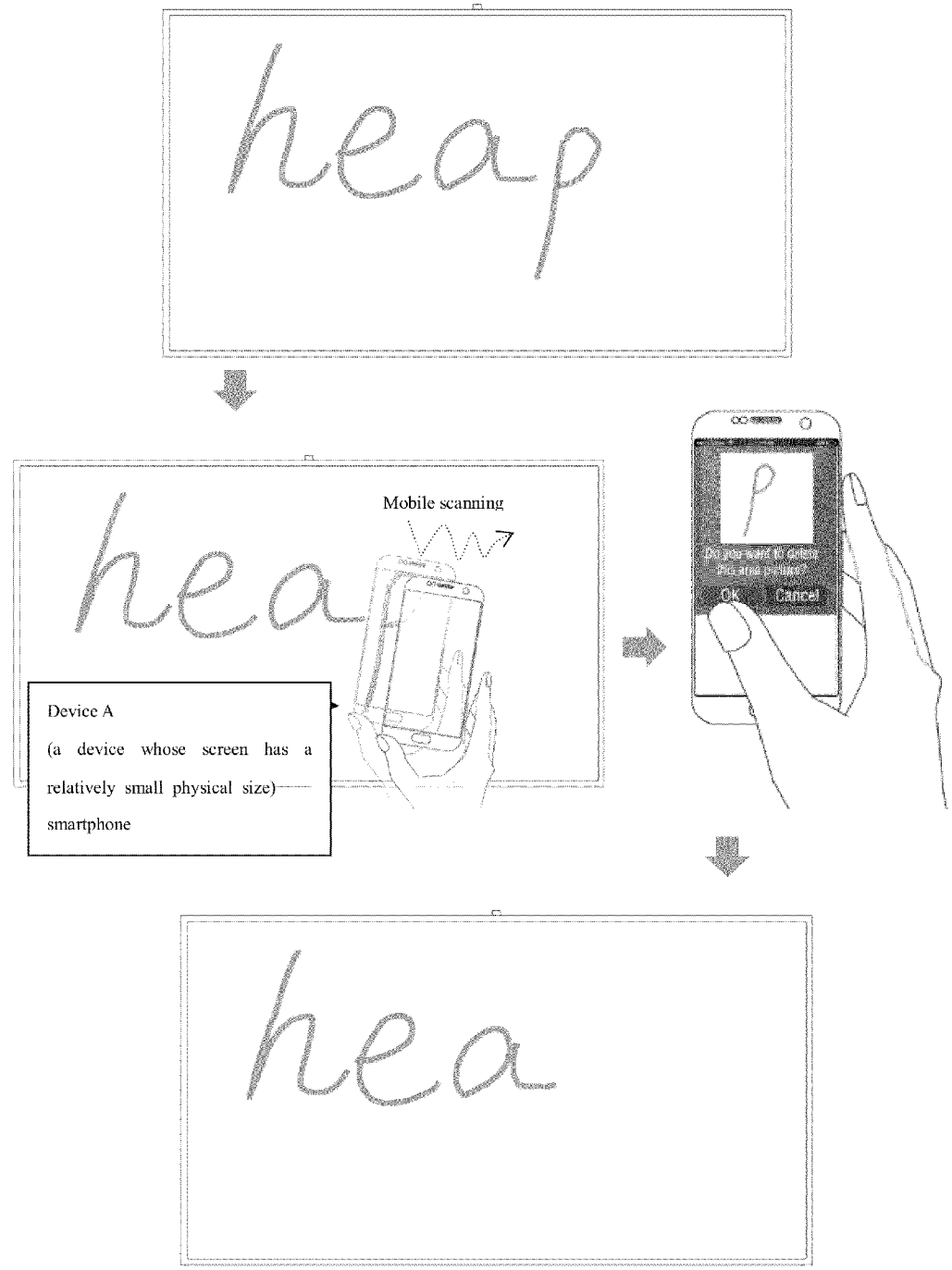

[Fig. 27]
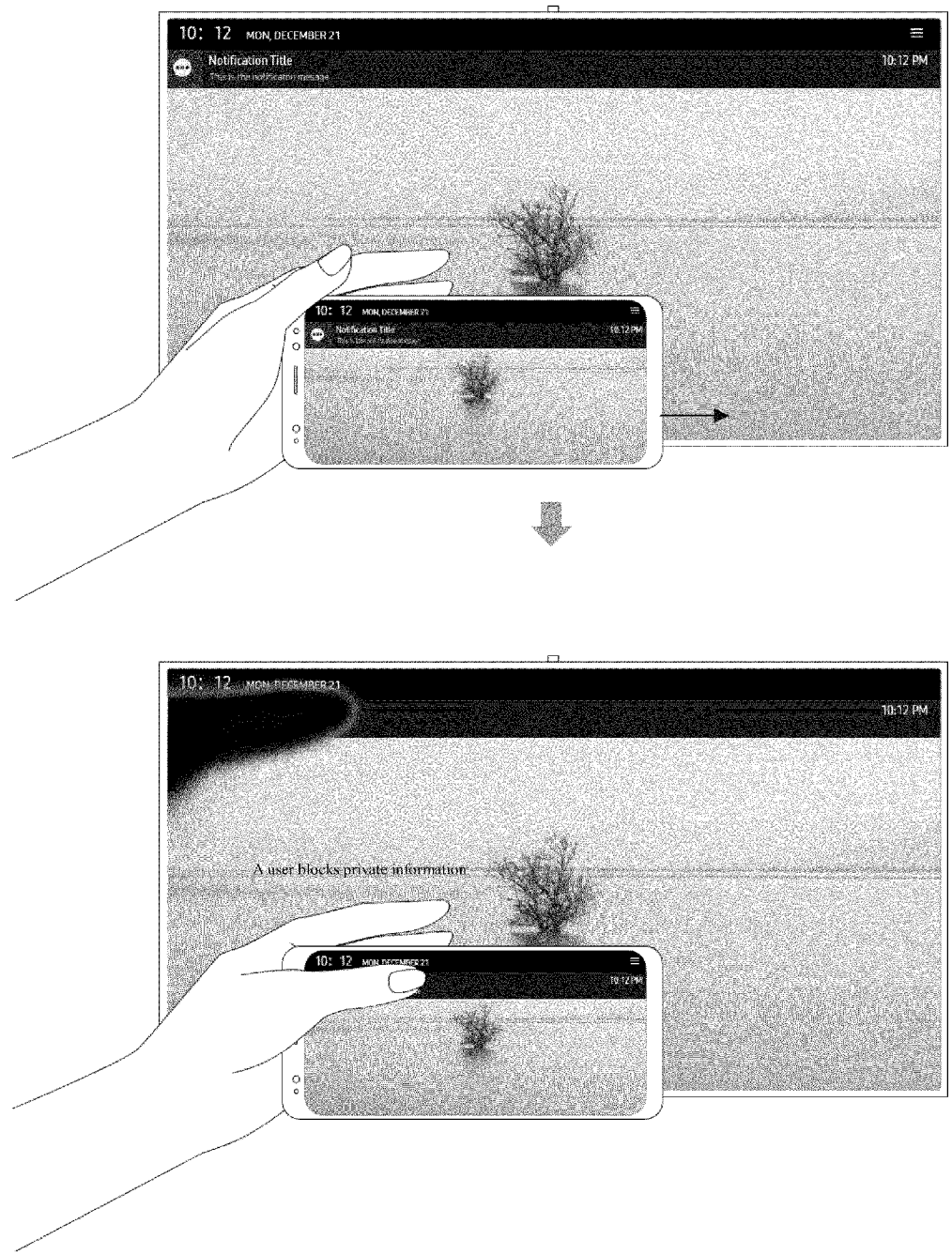

[Fig. 28]
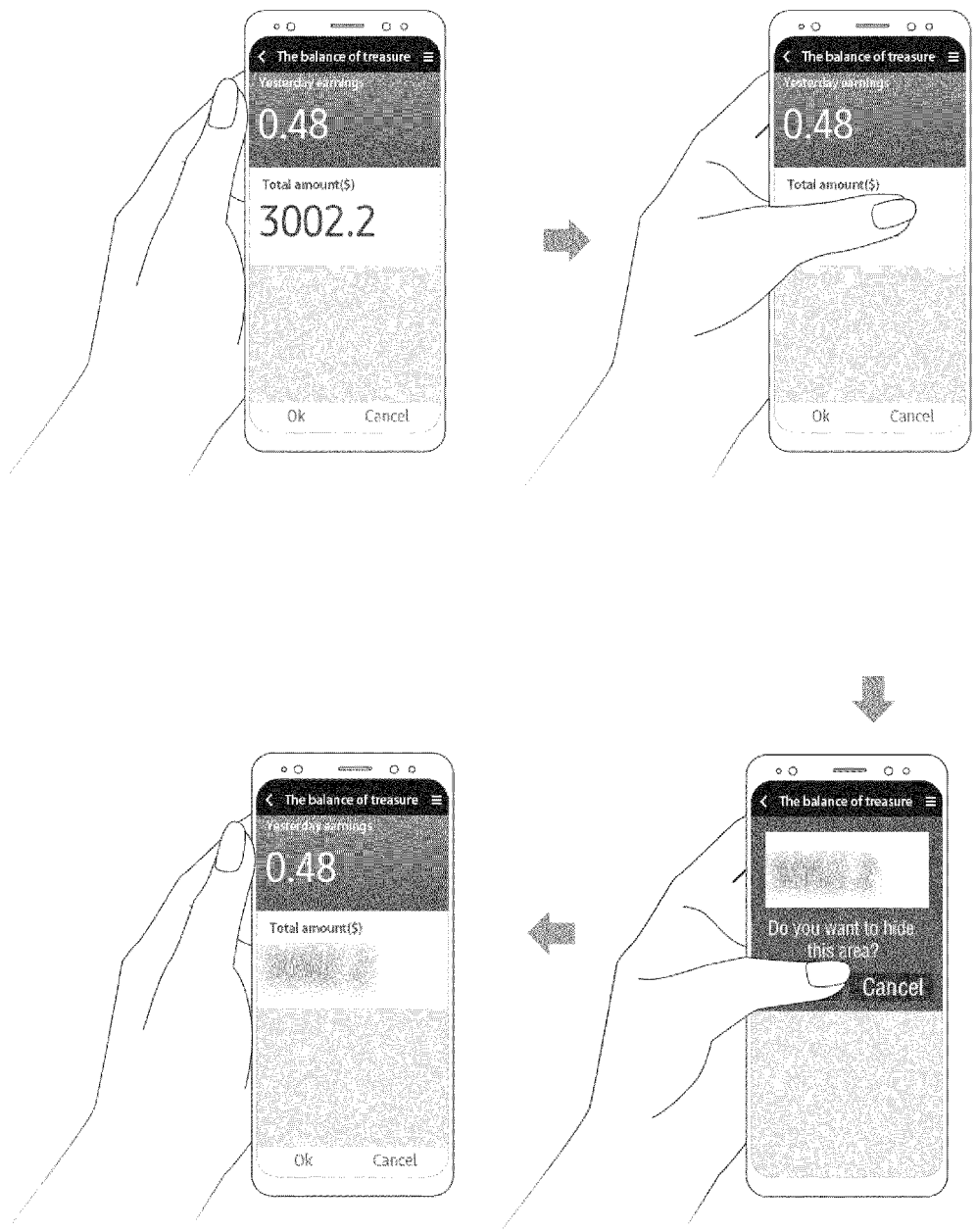

[Fig. 29]
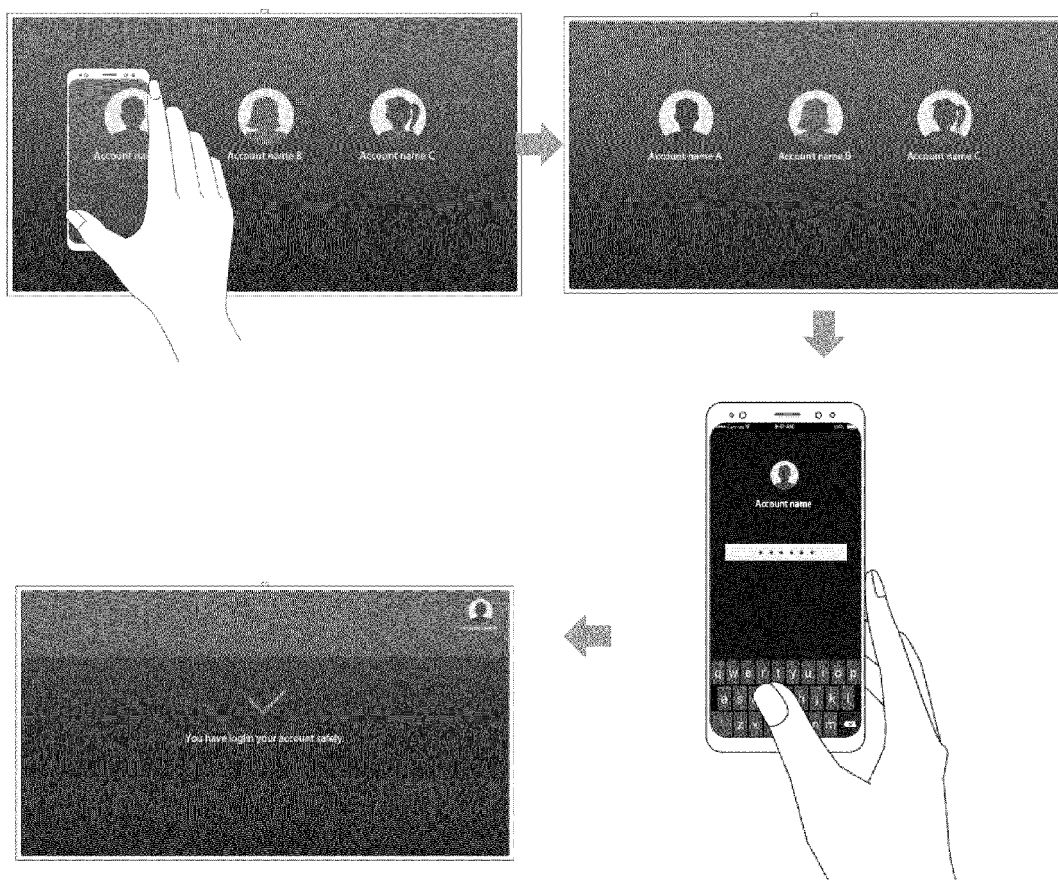

//INTERACTION METHOD, SYSTEM, AND DEVICE FOR INFORMATION

CROSS-REFERENCE TO RELATED APPLICATION(S)

This application is a National Phase Entry of PCT International Application No. PCT/KR2018/015139, which was filed on Nov. 30, 2018, the disclosure of which is incorporated herein by reference.

BACKGROUND

1. Technical Field

The application relates to computer network technology, and in particular, to interaction method, system, and device for information.

2. Description of Related Art

With the development of computer technology, information interaction or/and information synchronization may be performed between devices in a plurality of manners, and the devices may be wireless terminals or the like. At present, methods for information interaction or/and that for information synchronization mainly include: bluetooth transmission between devices, transmission between devices through near field communication (NFC), transmission between devices through a local network area which consists of the devices, and transmission between devices by means of WiFi or a mirror link technology. The mirror link technology is combined with a plurality of existing technologies to meet various possible internal usage scenarios of an automobile, including displacement of a screen and inputting of user instruction by means of virtual network computing, and searching for a corresponding device and completing a correct pre-set configuration through universal plug and play, information interaction such as audio streaming by means of Bluetooth and real time transport protocols. The mirror link technology also supports various technologies, such as Bluetooth, HFP and A2DP protocols, which are used in automobiles currently and usually. That is to say, a device may be connected to an in-vehicle system through a universal serial bus (USB), Bluetooth or WiFi. And the device may transmit an operation interface to an in-vehicle screen, to form a simple and clear menu interface on the in-vehicle screen, and the device is operated by physical buttons on the in-vehicle system or language commands.

In order to obtain desired information from other devices, a device first needs to identify information from the other devices. The information may be identified by a camera recognition technology, a text and number recognition technology or a photosensitive recognition technology. Wherein, information of text and image having a particular attribute, for example, a telephone number, a tracking number, a zip code, a website address, and a QR code may be recognized through the file and number recognition technology. A sensor may be implanted under the screen glass of a screen of a device, which is required in the photosensitive recognition technology. This type of sensor may capture changes in light and light waves. Based on the changes in light and light waves, a blocking relationship between screens of devices or between a terminal device and an object may be recognized, and information such as the position of the shielded area and the size of a screen pixel of the screen of the device may be learned, and thereby sharing and processing information in the shielded area may be performed through the photosensitive recognition technology.

Compared with the camera recognition technology, the photosensitive recognition technology is performed through obtaining information of a device by blocking the screen of the device. The operation of the recognition technology is simple, which does not need a user to perform tapping into a photographing program step by step to record information and image. The image shot by a camera is regular, and the screen area of a device can be blocked by an object of any shape, so that the obtained shielded area is within a range of irregular shape. This type of recognition is freer and more interesting. What is obtained through the photosensitive recognition technology is direct information data without imaging and light interference, and that obtained through the camera recognition technology is data of physical image format with light and interference of light and physical space distance.

SUMMARY

However, at present, the photosensitive recognition technology has not been applied to information interaction between devices. How to implement the information interaction between devices based on the photosensitive recognition technology specifically is a technical problem that needs to be solved urgently.

In view of this, an embodiment of the present application provides an interaction method for information. Information interaction between devices based on a photosensitive recognition technology may be implemented through this method.

An embodiment of the present application further provides an interaction system for information. Information interaction between devices based on a photosensitive recognition technology may be implemented through this system.

An embodiment of the present application further provides an interaction device for information. Information interaction between devices based on a photosensitive recognition technology may be implemented through this device.

According to the foregoing objectives, the present application is implemented as follows.

An interaction method for information, comprising:
recognizing, by a first device with a light-sensing screen, a non-transparent shielding object or a second device; and
transmitting, by the first device with a light-sensing screen, shielded screen information to the second device for processing.

An interaction system for information, wherein the system comprises a first device with a light-sensing screen and a second device, wherein
the first device with a light-sensing screen is configured to: recognize a non-transparent shielding object or the second device, and transmit shielded screen information to the second device; and
the second device is configured to process the screen information.

An interaction device for information, comprising: an recognition module and a transmission module, wherein
the recognition module is configured to recognize a non-transparent shielding object or a second device; and
the transmission module is configured to transmit shielded screen information to the second device.

It can be learned from the foregoing solutions that, after recongnizing a non-transparent shielding object or a second device, a first device with a light-sensing screen provided in the embodiments of the present application transmits shielded screen information to the second device for processing. One example is that the second device sends an operation instruction to the first device with a light-sensing screen according to a use scenario of a user, to change the screen information stored or/and displayed in the first device with a light-sensing screen. In this way, interaction for information according to user requirements based on a photosensitive recognition technology between different devices may be implemented in the present application.

An embodiment of the present application provides an interaction method for information. Information interaction between devices based on a photosensitive recognition technology may be implemented.

BRIEF DESCRIPTION OF THE DRAWINGS

FIG. 1 is a flowchart of an interaction method for information according to an embodiment of the present application;

FIG. 2 is a schematic diagram of a structural of an interaction system for information according to an embodiment of the present application;

FIG. 3 is a schematic diagram of a structural of an interaction device 1 for information according to an embodiment of the present application;

FIG. 4 is a schematic diagram of a structural of an interaction device 2 for information according to an embodiment of the present application;

FIG. 5 is a schematic diagram of a method for processing performed by a connection module in a first device having a light-sensing screen according to an embodiment of the present application;

FIG. 6 is a flowchart of a method for processing performed by a recognition module in a first device having a light-sensing screen according to an embodiment of the present application;

FIG. 7 is a flowchart of a method for processing performed by a transmission module according to an embodiment of the present application;

FIG. 8 is a flowchart of a method for processing performed by a secondary display module according to an embodiment of the present application;

FIG. 9 is a flowchart of a method for processing performed by a processing module according to an embodiment of the present application;

FIG. 10 is a schematic diagram of an example 1 in which a first device having a light-sensing screen is blocked according to an embodiment of the present application;

FIG. 11 is a schematic diagram of an example 2 in which a first device having a light-sensing screen is blocked according to an embodiment of the present application;

FIG. 12 is a schematic diagram of an example 3 in which a first device having a light-sensing screen is blocked according to an embodiment of the present application;

FIG. 13 is a schematic diagram of an example in which a first device having a light-sensing screen is blocked by a paper card and screen information is displayed on an intelligent device according to an embodiment of the present application;

FIG. 14 is a schematic diagram of an example in which a first device having a light-sensing screen is blocked by a pen and screen information is displayed on a smart watch according to an embodiment of the present application;

FIG. 15 is a schematic diagram of an example in which a first device having a light-sensing screen is blocked by a hand and information on the screen of the device is displayed on an intelligent device according to an embodiment of the present application;

FIG. 16 is a schematic diagram of an entrance for operation of a smartphone according to an embodiment of the present application;

FIG. 17 is a schematic diagram of a process of an example in which text information is recognized according to an embodiment of the present application;

FIG. 18 is a schematic diagram of a process of an example in which a picture is recognized and intercepted according to an embodiment of the present application;

FIG. 19 is a schematic diagram of a process of an example in which address information is recognized according to an embodiment of the present application;

FIG. 20 is a schematic diagram of a process of an example in which a QR code is recognized according to an embodiment of the present application;

FIG. 21 is a schematic diagram of a process of an example in which website address information is recognized according to an embodiment of the present application;

FIG. 22 is a schematic diagram of a process of an example in which telephone number information is recognized according to an embodiment of the present application;

FIG. 23 is a schematic diagram of a process of an example in which a cursor is recognized and text is edited according to an embodiment of the present application;

FIG. 24 is a schematic diagram of a process of an example in which editing is performed in a highlighting area in a text according to an embodiment of the present application;

FIG. 25 is a schematic diagram of a process of an example in which information is copied and pasted according to an embodiment of the present application;

FIG. 26 is a schematic diagram of a process of an example in which information in a area is deleted according to an embodiment of the present application;

FIG. 27 is a schematic diagram of a process of an example of projecting a screen securely according to an embodiment of the present application;

FIG. 28 is a schematic diagram of a process of an example in which private content is encrypted according to an embodiment of the present application; and FIG. 29 is a schematic diagram of a process of an example of securely logging in to a personal account according to an embodiment of the present application.

DETAILED DESCRIPTION

In order to make the objectives, technical solutions and advantages of the present application more comprehensible, the present application will be further described in detail below with reference to the accompanying drawings and embodiments.

As can be learned from the background, although a light-sensing screen is provided, the light-sensing screen and an interactive operation based on photographic properties of the light-sensing screen are not developed. In the background, portable interaction for quickly obtaining information by means of blocking with an opaque object or overlapping of screens of devices is not implemented. In the background, secondary processing for information after the information has been obtained by one screen from another screen, such as information extraction and displacement of reconstructed information, is not implemented. Transmission of natural screen regionalized information is not implemented in the manner of device synchronization in the background, but the regionalized information on the screen may be recognized by embodiments of the present application, and a user may naturally select a screen area of a device in which synchronization of information is needed.

There is no very natural and portable interaction form in the manner of transmission between devices in the background, but the embodiments of the present application provide a particularly natural interaction manner in which a user uses a device to touch a screen of a device to establish a pairing or connection, thereby obtains information of other devices. The manner of obtaining information content greatly meets the visual and psychological expectations of the user.

The information sharing between devices in the background is usually sharing information of a whole-screen, and a user may not select naturally a screen area for information sharing. The interaction manner thereof is only limited to operating through a gesture on one device to send an instruction for sharing information or picture, and technical solution that information interaction of device is trigged by means of natural contact or blocking of a screen device or an object may not be implemented.

Information on a photo may not be recognized, filtered and extracted in the manner of photographing and memorizing information of a screen of a device through photographing in the background. A camera application needs to be opened, shooting by clicking needs to be performed, a picture needs to be stored, and key information required by a user needs to be searched in a process for photographing. The process is cumbersome.

The problem in information acquisition or synchronization in the background is information redundancy. For information synchronization between devices, information is not distinguished based on information requirements of a user and application scenarios, and information is synchronously displayed on the device regardless of the scenario. The user may not obtain information in a particular part of the screen in a customized manner. The information redundancy increases the cost of information management on each device, and also brings insecurity of information management.

According to embodiments of the present application, a photosensitive recognition technology of a device screen is used. After a provided first device with a light-sensing screen recognizes a non-transparent shielding object or a second device, the first device transmits shielded screen information to the second device for processing. For example, the second device sends an operation instruction to the first device with a light-sensing screen according to a using scenario of a user, so that the screen information stored or/and displayed in the first device with a light-sensing screen is modified. In this way, information interaction may be achieved between different devices according to user demands based on a light-sensing recognition technology.

Specifically, the first device with a light-sensing screen calculates the position and size of an shielded area according to the brightness sensation of the screen of the first device which is shielded by the second device or a non-transparent shielding object. In response to a confirmative operation action of the user, the first device with a light-sensing screen quickly shares the screen information to the second device. After obtaining the screen information of the first device with a light-sensing screen, the second device may perform different processes for the screen information according to user demands based on the obtained screen information.

In this way, the second device may quickly intercept and process the shielded screen information of the first device with a light-sensing screen, and reconstruct the obtained screen information and display it on the second device secondary. When it is inconvenient for the user to carry or open the first device having a light-sensing screen, the user only needs to view the second device. When the first device having a light-sensing screen is large and inconvenient to move and the second device is small and is convenient to move, the shielded screen information is quickly obtained for the purpose of memo, mobile storage and portable displacement. This is an operation and interaction experience that greatly meets the psychological expectation of the user.

According to a text attribute of the obtained screen information of the first device with a light-sensing screen, the user is provided with different operation prompts, such as highlighting the text of the first device with a light-sensing screen, and quickly inserting text and other operations. This is convenient for the user to quickly input text information on a device with smaller screen to the first device with a light-sensing screen. The first device with a light-sensing screen is equipped with a larger screen, and provides portability on editing screen information.

In the embodiments of the present application, the shielded screen information on the first device with a light-sensing screen may also be encrypted to hide the shielded screen information. Alternatively, the shielded screen information on the first device with a light-sensing screen is about information of an area for inputting password. After a password is input on the second device, the password is directly input to a shielded screen area of the first device with a light-sensing screen for verification processing.

In the embodiments of the present application, the first device with a light-sensing screen may include a mobile phone, a tablet computer, an electronic screen, a television, a computer, and the like, and is not limited to the foregoing devices. The second device may include a mobile terminal device such as a mobile phone or a tablet computer, and is not limited to the foregoing devices.

FIG. 1 shows an interaction method for information according to an embodiment of the present application. The interaction method for information includes the following specific steps.

In step 101: a first device with a light-sensing screen recognizes a non-transparent shielding object or a second device.

In step 102: The first device with a light-sensing screen transmits shielded screen information to the second device for processing.

In this method, before step 101, the first device with a light-sensing screen establishes a communication connection with the second device.

In this method, the screen information is data, text, or a picture.

In this method, processing performed by the second device further includes: displaying or/and storing on the second device.

When the screen information is a picture, processing performed by the second device includes: intercepting a covered picture, and then performing splicing processing.

In this method, processing performed by the second device includes: performing addition, insertion, deletion, or an operation according to a pre-set operation instruction on the screen information, and then sending the processed screen information to the first device with a light-sensing screen for storage or/and for displacement in the shielded area.

In this method, the screen information is encrypted, and is not displayed or displayed in a fuzzy manner in the shielded area.

In this method, the screen information is a secure login interface, and processing performed by the second device includes:

filling a secure account in the secure login interface, and then sending the secure account to the first device with a light-sensing screen for verification and displacement in the shielded area.

FIG. 2 is a schematic diagram of a structural of an interaction system for information according to an embodiment of the present application. The interaction system for information includes a first device with a light-sensing screen and a second device. Wherein, the first device with a light-sensing screen is configured to: recognize a non-transparent shielding object or the second device, and transmit shielded screen information to the second device. And the second device is configured to process the screen information.

In this system, the first device with a light-sensing screen is further configured to establish a connection with the second device.

In this system, the second device is further configured to store or/and display the screen information.

In this system, the second device is further configured to: perform addition, insertion, deletion, or an operation according to a pre-set operation instruction on the screen information, and then send the processed screen information to the first device with a light-sensing screen for storage or/and for displacement in a shielded area.

The first device with a light-sensing screen is further configured to: after receiving the processed screen information, store or/and display the processed screen information in the shielded area.

In this system, the screen information is data, text, or a picture.

When the screen information is a picture, the second device is further configured to: intercept a covered picture, and then perform splicing processing.

In this system, the second device is further configured to: perform encryption processing on the screen information, and send the processed screen information to the first device with a light-sensing screen; and the first device with a light-sensing screen is further configured to: not display the screen information or display the screen information in a fuzzy manner in the shielded area.

In this system, the screen information is a secure login interface.

The second device is further configured to: fill a secure account in the secure login interface, and then send the secure account to the first device with a light-sensing screen for verification and displacement in the shielded area. And the first device with a light-sensing screen is further configured to: verify the received secure account and display the secure account in the shielded area.

FIG. 3 is a schematic diagram of a structural of an interaction device 1 for information according to an embodiment of the present application. The device 1 is a first device having a light-sensing screen, including an recognition module and a transmission module. Wherein, the recognition module is configured to recognize a non-transparent shielding object or a second device. And the transmission module is configured to transmit shielded screen information to the second device.

In this device, a connection module is further included to establish a connection to the second device.

In this apparatus, the transmission module is further configured to: receive processed screen information on which addition, insertion, deletion, or an operation according to a pre-set operation instruction are performed by the second device, and then store the processed information or/and display the processed information by a display module in a shielded area.

In this device, the transmission module is further configured to receive encrypted screen information sent by the second device. And a display module does not display the screen information or display the screen information in a fuzzy manner in the shielded area.

In this device, the transmission module is further configured to receive a secure account sent by the second device, and display the secure account in a shielded area for verification, and the screen information of the shield area is about a secure login interface.

FIG. 4 is a schematic diagram of a structural of an interaction device 2 for information according to an embodiment of the present application. The device 2 is a second device including a secondary display module and a processing module. Wherein, the secondary display module is configured to display shielded screen information sent by a first device with a light-sensing screen. And the processing module is configured to process the shielded screen information sent by the first device with a light-sensing screen.

In this device, the processing module is further configured to store or/and display the screen information.

In this device, the screen information is a picture, text, or data. And when the screen information is a picture, the device further includes a scanning module, which is configured to: perform mobile scanning on a screen shielding object which is above the first device with a light-sensing screen, and perform splicing processing on scanned information of the shielding object, to obtain screen information.

In this device, a connection module is further included, which is used for establishing a connection with the first device with a light-sensing screen.

In this device, the processing module is further configured to: perform addition, insertion, deletion, or an operation according to a pre-set operation instruction on the screen information, and then send the processed screen information to the first device with a light-sensing screen.

In this device, the processing module is further configured to: perform encryption processing on the screen information, and send the processed screen information to the first device with a light-sensing screen.

In this device, the screen information is a secure login interface. And the processing module is further configured to: fill a secure account in the secure login interface, and then send the secure account to the first device with a light-sensing screen.

The essence of this embodiment of the present application is that the user may extract the shielded screen information of the first device with a light-sensing screen by means of shielding, Thereby the user displays the shielded screen information on the second device. Transplanting an operation interface to another device is performed in the Mirror Link technology in the background, and regionalized filtration and extraction are not performed on content on the interface. In this embodiment of the present application, more differentiated scenario operations may be performed. Further, the shielding device may also perform operation control on the blocked device.

FIG. 5 is a schematic diagram of a method for processing performed by a connection module in a first device with a light-sensing screen according to an embodiment of the present application. The connection module is configured to detect whether the first device with a light-sensing screen and a second device are in a connected state. Connection is mainly used for: determining whether the second device is secure, only when the second device and the first device with a light-sensing screen are under secure connection authorization, subsequent information interaction may be performed. The specific steps are as follows.

In step 501: a distance is detected, and whether the distance between the first device with a light-sensing screen and the second device is within a connection distance.

In step 502: Whether a connection is established is determined, If not, step 503 will be performed; and if yes, process will be ended.

In step 503: establishing a connection with the second device is prompted.

In step 504: verification is performed to determine whether the connection is successfully established, if yes, step 505 will be performed; and if not, step 503 will be performed again.

In step 505: the connection is successfully established is prompted.

In step 506: connection information is stored.

In this connection module, the connection information is stored, so that verification may not need to be performed on a next connection for a user, which is convenient for user experience.

FIG. 6 is a flowchart of a method for processing of a recognition module in a first device with a light-sensing screen according to an embodiment of the present application. The first device with a light-sensing screen recognizes the relative object position or area size of a second device or a non-transparent shielding object through the screen of the first device. The second device is ready to obtain screen information of the first device with a light-sensing screen. A shielded screen area of the first device with a light-sensing screen is projected onto the second device. A user may move the second device or the non-transparent shielding object left and right to achieve precise positioning. The specific process includes following steps.

In step 601: A photosensitive element of a recognition module performs monitoring.

In step 602: The recognition module performs brightness detection of a screen area, to determine whether there is a dark area. If yes, step 603 will be performed; and If not, step 601 will be performed.

In step 603: information of the photosensitive element is obtained.

In step 604: position information of a shielded screen is obtained.

Specifically, because the first device with a light-sensing screen is equipped with a screen of a photosensitive attribute, the first device with a light-sensing screen is configured to recognize a position at which the second device or the non-transparent shielding object shields the screen of the first device thereof. When brightness of the screen monitored by the photosensitive element built in the recognition module is inconsistent, the size and the position of the corresponding screen area to be intercepted may be determined. Locating the position of the shielded screen may be performed by the existing technology.

Herein, locating the photosensitive position may be performed by the existing technology. The existing technology is described below. An optical sensor transistor in a photosensitive pixel in a photosensitive device is formed by an oxide semiconductor transistor for sensing light. The photosensitive device includes: an array of photosensitive pixel with a plurality of photosensitive pixels arranged in rows and columns; and a plurality of gate lines arranged along a row direction and supplying gate voltages to photosensitive pixels, respectively. Wherein, each photosensitive pixel includes an optical sensor transistor for sensing light and a switch transistor for outputting a photosensitive signal from the optical sensor transistor. A gate of an optical sensor transistor of a photosensitive pixel arranged in any row is connected to a gate line arranged in a row before or after the any row. Through the photosensitive pixel array and the plurality of gate lines involved in the present technology, locating the position of an area of a screen which is shielded by the object may be implemented.

A scanning module performs mobile scanning on the first device with a light-sensing screen below based on the second device or shielding object above, and splicing the scanned information of the shielding object to obtain screen information. Two steps are mainly included. In the first step, after the scanning mode is started, the photosensitive element in the first device with a light-sensing screen below continuously monitors the shielded area, and stores the current shielded area as a picture m once every k milliseconds. In the second step, after the scanning mode is ended, all the shielded areas collected in the first step are spliced.

For the first step, the current shielded area is reserved every k milliseconds, where the value of k is as small as possible. In theory, the smaller the value is, the effect is better. However, considering the splicing processing in the second step and the problem of performance, it is suggested that the value is 100 to 500 milliseconds.

The splicing processing in the second step may be performed by existing technology. For example, the stitcher class of opencv implements splicing, and the class provides methods such as createDefault, estimatedTransform, and composePanorama, so that splicing processing may be performed conveniently on multiple images to form a complete scenario picture.

FIG. 7 is a flowchart of a method for processing performed by a transmission module according to an embodiment of the present application. The transmission module sends screen information of an area overlapped with a second device or a non-transparent shielding object to the second device, and the screen information is stored in the second device. The main function of the module is similar to function of a lens. The module transmits an image of shielded area to the second device in real time, Which facilitates controlling the second device more clearly and easily. The specific steps are as follows.

In step 701: a sensing area of a photosensitive element in a device uniquely with a light-sensing screen is intercepted.

In step 702: after the sensing area is spliced, screen information is obtained, and is transmitted to a second device in a picture format.

In step 703: The second device prompts a user whether to intercept the picture. If yes, step 704 will be performed. If not, this process will be ended.

In step 704: The second device stores the information of the intercepted picture.

FIG. 8 is a flowchart of a method for processing of a secondary display module according to an embodiment of the present application. The secondary display module is used by a second device to perform secondary extraction on screen information obtained from a first device with a light-sensing screen, and redisplay the extracted screen information. The specific steps are as follows.

In step 801: screen information that has been stored is obtained, the screen information is a picture.

In step 802: prompt information selected by a user for display is received.

In step 803: whether to display the picture is determined. If yes, step 804 will be performed; and if not, step 805 will be performed.

In step 804: the screen information is continually stored, the screen information is the picture.

In step 805: a type of information selected by the user for extraction is received.

In step 806: Extraction for information is performed in screen information.

In the secondary display module, in addition to directly intercepting the picture, the user may also flexibly select required information of picture, such as pure text information or numerical information. The selected required information is performed by information recognition and processing, interface re-layout and content attribute definition, and then is stored and displayed on the second device.

FIG. 9 is a flowchart of a method for processing of a processing module according to an embodiment of the present application. Screen information is processed on a second device to facilitate user operations. Further, the processing of screen information may be divided into two categories: viewing and modification. Furthermore, by means of viewing, a telephone number, a QR code, and a website address may be identified, an express bill may be obtained, and the like. Furthermore, by means of modification, an intercepted area may be highlighted, a cursor of a text and modified text nay be recognized and synchronized to a first device with a light-sensing screen, the intercepted area may be pasted, deleted, and the like. In this method, security-related functions such as hiding special area information may be implemented.

In step 901: Determine whether a hidden mode is detected. If yes, step 902 will be performed; and if not, the process will be ended.

In step 902: hidden screen information is confirmed.

In step 903: the determined screen information is encrypted.

In step 904: The determined screen information is not displayed or displayed in a fuzzy manner.

Secure login may also be implemented according to this method. The secure login includes following steps.

In step 905: Determine whether a secure login mode is detected. If yes, step 906 will be performed; and otherwise, the process will be ended.

In step 906: prompt information of inputting a secure password is sent to a user.

In step 907: the security password input by the user is received.

In step 908: the secure password input by the user is verified.

In step 909: a verification result is displayed to the user.

Interaction scenarios for information according to embodiments of the present application are described below. The information interaction scenarios are mainly divided into three types. The first type is interception and conversion display of text information and picture information. The second type is supplementary input of information and covering for area instructions. And the third type is secure encryption of information of device.

The first type: interception and conversion display of text information and picture information text information is intercepted.

a second device intercepts character data such as a telephone number, a QR code, a website address, an address, a tracking number, a zip code, date information and weather information that are displayed on a first device with a light-sensing screen.

Manner 1: the second device shields the first device with a light-sensing screen.

A user places a screen of the second device upward on the first device with a light-sensing screen, and may shift the second device to read and recognize a wider range of text information. At this time, character data information of an overlapping area of the screens of the two devices may be displayed on the screen of the second device. The information of the attribute of the character information is recognized. Important information such as a telephone number is filtered and displayed on the screen of the second device. After the user confirms that the information recognized and displayed by the second device meets the requirement of the user, the user performs an operation of tapping the device to complete transmission and storage of the device information.

The specific steps are as follows.

In step 1: A second device is placed above a first device with a light-sensing screen, and the second device recognizes a relative physical position of a screen of the first device with a light-sensing screen.

Step 2: On a premise that the first device with a light-sensing screen establishes a secure connection to the second device, the first device with a light-sensing screen sends display information of an overlapping area of the screen of the first device to the second device.

Step 3: The second device stores the obtained display information in itself.

Step 4: The second device converts a manner of displaying of the stored display information, redisplays it to the user in an appropriate format and form, and further associates an operation instruction.

Step 5: The second device presents the information or further processes and operates the information according to the operation instruction input by the user.

Manner 2: any non-transparent shielding object shields the first device with a light-sensing screen The user places a non-transparent shielding object of any shape above the first device with a light-sensing screen, and may shift the non-transparent shielding object to read and recognize a wider range of text information. At this time, character data information that is of the first device with a light-sensing screen which is shielded by the non-transparent shielding object may be displayed on the screen of the second device. And an attribute of the information of the character is recognized. And important information such as a telephone number is filtered and is display on the screen of the second device. After the user confirms that the information recognized by the second device and displayed on the second device meets the requirement of the user, the user performs an operation of tapping the device to complete transmission and storage of information of a text.

The specific steps are as follows.

In step 1: Any non-transparent shielding object is placed above a first device with a light-sensing screen, and the first device with a light-sensing screen recognizes a relative physical position and shape of the non-transparent shielding object.

In step 2: A secure connection is established between the first device with a light-sensing screen and a second device. The two do not need to overlap and touch each other, and the first device with a light-sensing screen transmits display information of an area shielded by the non-transparent shielding object to the second device.

In step 3: The second device stores the display information obtained by blocking of the opaque blocking object in the second device.

The second device converts a manner of displaying the stored display information, redisplays it to the user in an appropriate format and form, and further associates an operation instruction.

In step 5: The second device presents the information or further processes and operates the information according to the operation instruction input by the user.

Interception is performed on image.

Interception for image refers to that a second device directly intercepts, in a screenshot form, information displayed on a first device with a light-sensing screen, and stores the information in a picture format. The user may view screen content of an area where the second device overlaps with the first device with a light-sensing screen. The position of an area where picture is intercepted is determined. Thereby the information is stored as a picture and the picture is directly displayed, which is independent of the first device with a light-sensing screen.

Manner 1: the second device shields the first device with a light-sensing screen.

In step 1: the second device is placed above the first device with a light-sensing screen. And the second device recognizes a relative physical position of a screen of the first device with a light-sensing screen.

In step 2: On a premise that the first device with a light-sensing screen establishes a secure connection with the second device, the first device with a light-sensing screen sends display information of an overlapping area of the screen to the second device in a screenshot form.

In step 3: The second device stores the information of the obtained picture in the second device.

In step 4: The second device displays the information of the stored picture to a user.

Manner 2: any non-transparent shielding object shields the first device with a light-sensing screen.

In step 1: Any non-transparent shielding object is placed above a first device with a light-sensing screen, and the first device with a light-sensing screen recognizes a relative physical position and shape of the non-transparent shielding object.

In step 2: A secure connection is established between the first device with a light-sensing screen and the second device, the two do not need to overlap and touch each other, and the first device with a light-sensing screen transmits display information of an area shielded by the non-transparent shielding object to the second device in a screenshot form.

In step 3: The second device stores information of the obtained picture in the second device.

In step 4: The second device displays the information of the stored picture to a user.

The second type is supplementary input of information and covering for area instructions.

Supplementary input of information and covering for area instructions refer to that after a second device obtains text information on the first device with a light-sensing screen, according to instructions input by the user on the second device, the second device may implement processing instructions such as supplementary inputting, highlighting, deleting, copying, and storing the information on the first device with a light-sensing screen.

The specific steps include following steps.

In step 1: A second device or a non-transparent shielding object is placed above a first device with a light-sensing screen, and the first device with a light-sensing screen recognizes a relative physical position of an area of the screen of the first device at which the screen is blocked.

In step 2: On a premise that the first device with a light-sensing screen establishes a secure connection with the second device, the first device with a light-sensing screen sends display information of an overlapping area of the screen of the first device to the second device.

In step 3: The second device prompts instructions of processing for information such as edition, deletion, highlighting, storage, and copy to a user.

In step 4: The second device processes the instructions of the user on display information of the first device with a light-sensing screen.

The third type is secure encryption for device information.

Secure encryption for information refers to that on the screen of a first device with a light-sensing screen, the user blocks content which is expected to be securely encrypted. Thereby intelligent hiding or locking on the content of the shielded area is implemented. On the other hand, the first device with a light-sensing screen is shielded by different devices, so that after user accounts of the different devices successfully match an account on the first device with a light-sensing screen, secure login of different accounts is implemented.

The specific steps include the following steps:

In step 1: A second device or a non-transparent shielding object is placed above a first device with a light-sensing screen, and the first device with a light-sensing screen recognizes a relative physical position of an area of the screen of the first device at which the screen is blocked.

In step 2: The first device with a light-sensing screen performs intelligent encryption, hiding, or locking on content of a shielded area.

In this step 2', by matching information attributions of the shielded area with information stored in the second device, different account identities are recognized.

Several specific embodiments are listed below.

Embodiment 1: directly shielding by an intelligent device is performed.

FIG. 10 is a schematic diagram of an example 1 in which a first device with a light-sensing screen is blocked according to an embodiment of the present application. As shown in the figure, a second device used by a user is a smart watch with a screen. The first device with a light-sensing screen is directly shielded, and obtained screen information is displayed on the smart watch.

FIG. 11 is a schematic diagram of an example 2 in which a first device with a light-sensing screen is shielded according to an embodiment of the present application. As shown in the figure, a second device used by a user is a mobile terminal with a screen, and the first device with a light-sensing screen is directly shielded, and obtained screen information is displayed on the mobile terminal.

FIG. 12 is a schematic diagram of an example 2 in which a first device with a light-sensing screen is shielded according to an embodiment of the present application. As shown in the figure, second devices used by a user are a smart watch, a mobile terminal, and an intelligent tablet device which are all equipped with a screen. And the first device with a light-sensing screen is a device with a large electronic screen. The first device is directly shielded, and obtained screen information is displayed on the smart watch, the mobile terminal, and the intelligent tablet device.

Embodiment 2: blocking is performed by a non-transparent shielding object of any shape.

A user blocks a first device with a light-sensing screen using any non-transparent shielding object around. Obtained information is indirectly displayed on the second device, which is an intelligent device. As shown in FIG. 13, FIG. 14, and FIG. 15, FIG. 13 is a schematic diagram of an example in which a first device with a light-sensing screen is shielded by a paper card and screen information is displayed on an intelligent device according to an embodiment of the present application. FIG. 14 is a schematic diagram of an example in which a first device with a light-sensing screen is shielded by a pen and screen information is displayed on a smart watch according to an embodiment of the present application. FIG. 15 is a schematic diagram of an example in which a first device with a light-sensing screen is shielded by a hand and screen information is displayed on an intelligent device according to an embodiment of the present application.

Embodiment 3: an embodiment of recognition for content and an operation effect after the recognition is described.

For example, a smartphone is used as a second device. FIG. 16 is a schematic diagram of an operation entrance of the smartphone according to an embodiment of the present application.

Embodiment 4: an embodiment of intercepting and processing for text information or pictures is described.

A existing first device with a light-sensing screen located in a secure environment and a second device located in a secure environment are specifically implemented.

In step 1: the first device with a light-sensing screen and the second device are paired and connected. A secure connection between the first device with a light-sensing screen and the second device is established. Wherein, the first device with a light-sensing screen allows the second device to obtain information of the first device with a light-sensing screen.

In step 2: the second device or a non-transparent shielding object is displayed above the first device with a light-sensing screen in an overlapping manner. In this step, a user places the second device or the non-transparent shielding object above the first device with a light-sensing screen in an overlapping manner.

In step p 3: When text information is recognized, the user may move the first device with a light-sensing screen or the non-transparent shielding object. The text information on the first device with a light-sensing screen is read one by one. When interception for picture is performed, the second device obtains a picture on the shielded screen of the first device with a light-sensing screen.

In step 4: The second device pops up a confirmation interface. The user finally confirms an operation of obtaining the information. The obtained information is stored or run.

In step 5: the information is viewed. Because the first device with a light-sensing screen is relatively large, and it is inconvenient to move and carry the first device with a light-sensing screen, when the first device with a light-sensing screen is far away from the scene of the second device, the user only needs to carry the second device, and directly view intercepted information from a screen of the second device.

Example 1

As shown in FIG. 17, FIG. 17 is a schematic diagram of a process of an example in which text information is intercepted according to an embodiment of the present application. In this example, a second device that recognizes a tracking number is a smart watch. A first device with a light-sensing screen is a smartphone. Information of a tracking number is displayed on the smartphone of a user. A paired smart watch is placed on an area of the screen of the smartphone in an overlapping manner, where the tracking number is displayed. For a text area that cannot be covered by the smart watch, the user may recognize text information one character by one character by shifting the smart watch. The information is finally integrated and displayed on the smart watch. The user may complete the behavior of fetching a express by carrying only the smart watch without carrying the smartphone.

Example 2

As shown in FIG. 18. FIG. 18 is a schematic diagram of a process of an example in which a picture is recognized and intercepted according to an embodiment of the present application. In the figure, a second device is a smartphone, and a first device with a light-sensing screen is a smart tablet computer. The smart tablet computer has a relatively large screen and is not easy to carry. A user may place the smartphone above the screen of the smart tablet. The smartphone is moved to locate a screen area that needs to be intercepted. And the smart tablet computer recognizes a screen area of the smartphone above. After the user touches the smart tablet computer by a back side of the smartphone, picture areas of a photo or an advertisement needed by the user are directly intercepted. The pictures are transferred to the smartphone and stored in the smartphone. The user only needs to carry the smartphone to memorize and view the picture.

Example 3

As shown in FIG. 19, FIG. 19 is a schematic diagram of a process of an example in which address information is recognized according to an embodiment of the present application. In the figure, a second device is an intelligent mobile terminal. The first device with a light-sensing screen is a television display screen of a television. Public text information is displayed in an advertisement area of the display screen of the television. A user holds the second device, that is, the intelligent mobile terminal, and may quickly obtain contact information by tapping an area in which an address is displayed on the display screen of the television. And a specific position may be searched in a map of the intelligent mobile terminal. Thereby, the objective of quickly viewing is achieved.

Example 4

As shown in FIG. 20, FIG. 20 is a schematic diagram of a process of an example in which a QR code is recognized according to an embodiment of the present application. In the figure, a second device is an intelligent terminal device, and a first device with a light-sensing screen is a smartphone or a tablet computer. The information of a QR code is displayed on the screen of the smartphone or the tablet computer. The second device is used to scan the area in which the QR code is located. The information of the QR code may be read and a related link according to the QR code may be linked to. For example, a page for account transfer and payment may be directly opened, so that the efficiency of payment is improved.

Example 5

As shown in FIG. 21, FIG. 21 is a schematic diagram of a process of an example in which information of website address is recognized according to an embodiment of the present application. In the figure, a second device is a smartphone, and a first device with a light-sensing screen is a computer monitor. Information of text, pictures, and address of website is displayed on a screen of the computer monitor. A user holds the smartphone to cover the information of a web site address on the screen of the computer monitor. The smartphone may obtain the information of the website address. The website may be directly opened in the smartphone or stored as text.

Example 6

As shown in FIG. 22. FIG. 22 is a schematic diagram of a process of an example in which information of telephone number is recognized according to an embodiment of the present application. In the figure, a second device is a smartphone, and a first device with a light-sensing screen is a computer monitor. The content including a telephone number is displayed on the screen of the computer monitor. The user holds the second device to cover or scan an area on which the telephone number is displayed of the screen of the computer monitor. The second device obtains the telephone number in the covered or scanned area. And the second device prompts the user whether to save it as a telephone number or whether to make a call.

Embodiment 5: an embodiment of supplementary input and instructions of text information is performed.

In this embodiment, a user touches different information areas in a first device with a light-sensing screen by a second device. And the second device prompts different information to implement different functions of information processing. The specific process for implementation includes the following steps.

In step 1: a first device with a light-sensing screen and a second device are paired and connected. A secure connection between the first device with a light-sensing screen and the second device is established. The first device with a light-sensing screen allows the second device to obtain and process information of the first device with a light-sensing screen.

In step 2: the second device or a non-transparent shielding object is placed above the first device with a light-sensing screen in an overlapping manner. In this step, a user places the second device or the non-transparent shielding object above the first device with a light-sensing screen in an overlapping manner.

In step 3: When text information is recognized, the user may move the first device with a light-sensing screen or the non-transparent shielding object. The text information on the first device with a light-sensing screen is red one e by one. When picture is intercepted, the second device obtains a picture on the shielded screen of the first device with a light-sensing screen.

In step 4: The user confirms an operation of obtaining the information.

In step 5: The second device obtains the information on the first device with a light-sensing screen. The second device pops up an operation instruction interface of operation instruction. The user performs a corresponding instruction operation of editing the information, to implement modification on the information on the first device with a light-sensing screen. The modified information may be stored in the first device with a light-sensing screen.

This method can solve the problem that the input is inconvenient because the first device with a light-sensing screen is relatively large. The user may quickly process the information of the first device with a light-sensing screen through the second device.

Example 1

As shown in FIG. 23. FIG. 23 is a schematic diagram of a process of an example in which a cursor is recognized and text is edited according to an embodiment of the present application. As shown in the figure, a first device with a light-sensing screen is an intelligent device with a large electronic screen. The screen of the first device with a photosensitive screen has a relatively large area and is inconvenient to be input. A second device is a smartphone held by a user. After the large electronic screen is lightly scanned by the smartphone, partial text information on the large electronic screen is obtained. And the position of the cursor is recognized. And then information on the large electronic screen may be quickly input and edited through the smartphone. Editing also includes deleting text. Specifically, the cursor on the large electronic screen is covered by the smartphone. The information of whether the text needs to be quickly inserted is displayed on the smartphone. The user inputs text on the smartphone, and the input text is inserted into the screen of the first device with a light-sensing screen.

Example 2

As shown in FIG. 24. FIG. 24 is a schematic diagram of a process of an example in which a highlight area in text is edited according to an embodiment of the present application. As shown in the figure, a first device with a light-sensing screen is an intelligent device with a large electronic screen. The screen of the first device with a light-sensing screen has a relatively large area and is inconvenient to be input. A second device is a smartphone held by a user. After the smartphone slightly scans the large electronic screen, the area covered by the smartphone is automatically highlighted.

Example 3

As shown in FIG. 25. FIG. 25 is a schematic diagram of a process of an example in which information is copied and pasted according to an embodiment of the present application. As shown in the figure, a first device with a light-sensing screen is an intelligent device with a large electronic screen. The screen of the first device with a light-sensing screen has a relatively large area and is inconvenient to be input. A second device is a smartphone held by a user. The large electronic screen is slightly scanned by the smartphone, and the area covered by the screen of the smartphone is locked as an area of picture will be copied. When the smartphone shields other areas of the large electronic screen or other devices again, the copied picture area for copying picture may be selected for pasting.

Example 4

As shown in FIG. 26. FIG. 26 is a schematic diagram of a process of an example in which area information is deleted according to an embodiment of the present application. As shown in the figure, a first device with a light-sensing screen is an intelligent device with a large electronic screen. The screen of the first device with a light-sensing screen has a relatively large area and is inconvenient to be input. A second device is a smartphone held by a user. The user holds the smartphone and slightly scans the large electronic screen by the smartphone. The area covered by the mobile phone screen is locked as an area of picture will be deleted. The user deletes the content of the area after confirmation.

Embodiment 6: method for encryption and interaction is implemented for information security A user touches a screen area of a first device with a light-sensing screen by a second device or a non-transparent shielding object. Information of the screen area is locked or hidden. The first device with a light-sensing screen recognizes an information attribute of the second device, and runs login for an account.

The specific implementation of the encryption process includes following steps.

In step 1: a non-transparent shielding object is placed on a screen of the first device with a light-sensing screen.

In step 2: A user moves the non-transparent shielding object, to shield information that the user expects to encrypt.

In step 3: The user confirms an operation of encryption or locking.

In step 4: partial information of the first device with a light-sensing screen is hidden or locked.

The specific implementation of secure login for account includes following steps.

In step 1: A first device with a light-sensing screen records different account identities. A plurality of different devices has established secure connections with the first device with a light-sensing screen.

In step 2: A second device which is securely connected is placed on the first device with a light-sensing screen in an overlapping manner.

In step 3: A user may move the second device or a non-transparent shielding object to match an area for displaying password displayed on the first device with a light-sensing screen with information of password input on the second device.

In step 4: The user confirms that user account has been matched successfully.

In step 5: logging in the first device with a light-sensing screen with a personal secure account is successfully implemented.

Example 1

As shown in FIG. 27. FIG. 27 is a schematic diagram of a process of an example of secure screen projection according to an embodiment of the present application. In the figure, a first device with a light-sensing screen is a mobile phone. A user projects content of the mobile phone onto a screen of a television screen. Notification message of personal mobile phone of the user is personal privacy and does not want to be projected. At this time, the user shields an area of notification message of the mobile phone, and the area will not be projected.

Example 2

As shown in FIG. 28. FIG. 28 is a schematic diagram of a process of an example in which private content is encrypted according to an embodiment of the present application. In the figure, a first device with a light-sensing screen is a mobile phone. A user may directly shield an information area that the user wishes to be shielded, so that the content of the shielded area is hidden or blurred. Encryption is implemented, so that the content is not seen by other people.

Example 3

As shown in FIG. 29, FIG. 29 is a schematic diagram of a process of an example of securely logging in to a personal account according to an embodiment of the present application. In the figure, a first device with a light-sensing screen is a television, showing the existing login entrances of different account. Different users may use their own mobile phone devices to shield their respective areas of login entrance of account. When a password input by a user on a personal mobile phone device is consistent with that recorded in the television, secure login is implemented.

The method, system and apparatus provided in the embodiments of the present application implement particularly natural information transmission and information processing between large screen and small screen. Information includes text recognition and picture interception, processing for text information and picture information, secure encryption for text information or picture information, secure login for account, and the like. An interaction manner of information encryption is a interaction implemented by particularly natural touch of device. The user only needs to lightly place a device convenient to move and carry on a screen of another device inconvenient to move, so that the user may quickly obtain partial fragmented information desired by the user. Information of the large screen may be processed by the small screen. Secure encryption of information is implemented. Quick response is implemented for information between the two devices. Great convenience has been brought to people's life.

The foregoing preferred embodiments further describe, in detail, the objectives, technical solutions, and advantages of the present application. It should be understood that the foregoing descriptions are merely preferred embodiments of the present application, and are not intended to limit the present application. Any modification, equivalent replacement, improvement, and the like made within the spirit and principle of the present application should fall within the protection scope of the present application.

The invention claimed is:

1. An interaction method for information, comprising:
  establishing a communication connection between a first device with a light-sensing screen and a second device;
  detecting by the first device with the light-sensing screen, a non-transparent shielding object or the second device; and
  transmitting, by the first device with the light-sensing screen to the second device, shielded screen information to display a user interface related to the shielded screen information in the second device based on processing the shielded screen information,
  wherein the shielded screen information is information shielded on the light-sensing screen of the first device by the non-transparent shielding object or the second device, and
  wherein the user interface is used to receive additional information related to the shielded screen information in the second device.

2. The interaction method of claim 1, wherein the shielded screen information comprises at least one of data, text, or picture, and wherein the shielded screen information is intercepted and performed splicing processing on the shielded screen information by the second device.

3. The interaction method of claim 1, further comprising: receiving information on which an addition, an insertion, a deletion, or an operation according to a pre-set operation instruction on the shielded screen information is performed from the second device.

4. The interaction method of claim 1, further comprising: not displaying the shielded screen information or displaying the shielded screen information in a fuzzy manner in a shielded area by the first device with the light-sensing screen after the shielded screen information is encrypted by the second device.

5. The interaction method of claim 1, wherein, the user interface is a secure login interface, and the additional information is secure information related to the secure login interface, the interaction method further comprises:
displaying a verification result according to verification on the secure information received in the second device.

6. An interaction A first device for information, comprising:
a display; and
a processor configured to:
establish a communication connection between the first device with a light-sensing screen and a second device;
detect a non-transparent shielding object or the second device; and
transmit, to the second device, shielded screen information to display a user interface related to the shielded screen information in the second device based on processing the shielded screen information,
wherein the shielded screen information is information shielded on the light-sensing screen of the first device by the non-transparent shielding object or the second device, and
wherein the user interface is used to receive additional information related to the shielded screen information in the second device.

7. The first device of claim 6, wherein the processor is further configured to:
receive the shielded screen information on which an addition, an insertion, a deletion, or an operation according to a pre-set operation instruction on the shielded screen information is performed from the second device.

8. The first device of claim 6, wherein the processor is further configured to:
receive encrypted shielded screen information from the second device; and
control the display to not display the shielded screen information or display the shielded screen information in a fuzzy manner in a shielded area.

9. The first device of claim 6, wherein the user interface is a secure login interface, and the additional information is a secure information related to the secure login interface, and
wherein the processor is further configured to:
display a verification result according to verification of the secure information received in the second device.

10. A second device for information, comprising:
a display; and
a processor configured to:
establish a connection with a first device with a light-sensing screen and the second device;
receive, from the first device with the light-sensing screen, shielded screen information;
display a user interface related to the shielded screen information based on processing the shielded screen information; and
receive additional information related to the shielded screen information in the user interface,
wherein the shielded screen information is information shielded on the light-sensing screen of the first device by a non-transparent shielding object or the second device.

11. The second device of claim 10, wherein the shielded screen information comprises at least one of a picture, text, or data; and
wherein, the processor is further configured to:
perform mobile scanning on a screen shielding object of the first device with the light-sensing screen, and
perform splicing processing on scanned information of the screen shielding object, to obtain the shielded screen information.

12. The second device of claim 10, wherein the processor is further configured to:
perform an addition, an insertion, a deletion, or an operation according to a pre-set operation instruction on the shielded screen information, and transmit the processed shielded screen information to the first device with the light-sensing screen.

13. The second device of claim 10, wherein the processor is further configured to:
perform encryption processing on the shielded screen information, and transmit the processed shielded screen information to the first device with the light-sensing screen.

14. The second device of claim 10, wherein, the user interface is a secure login interface, and the additional information is secure information related to the secure login interface,
wherein the processor is further configured to:
receive the secure information on the secure login interface, and
wherein a verification result according to verification of the secure information received in the second device is displayed on the first device.

* * * * *